Figure 1:
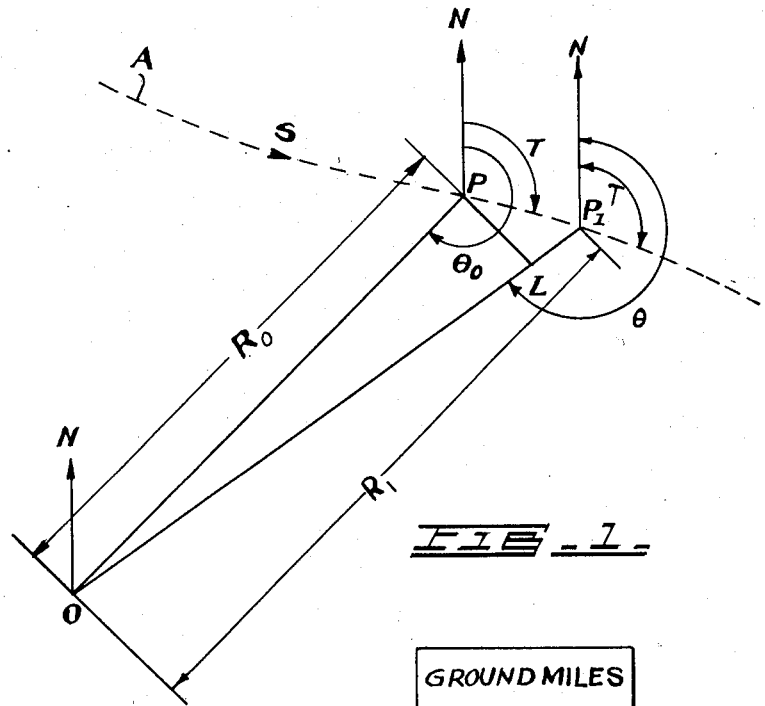

Nov. 3, 1959            J. G. WRIGHT            2,911,143

MEANS FOR POLAR COORDINATE NAVIGATION

Filed Nov. 17, 1954            12 Sheets-Sheet 1

INVENTOR
JERAULD G. WRIGHT

By Smart & Biggar

ATTORNEYS.

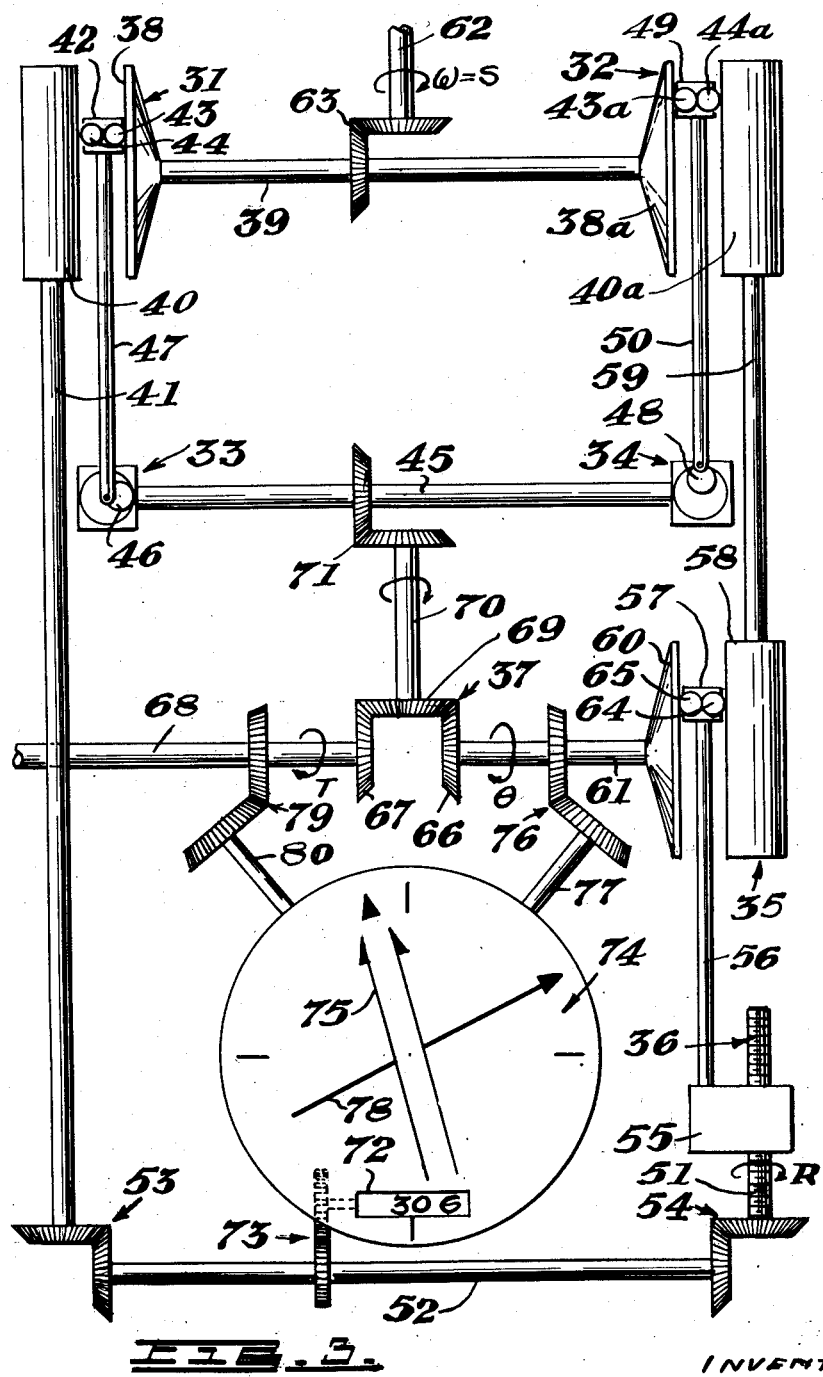

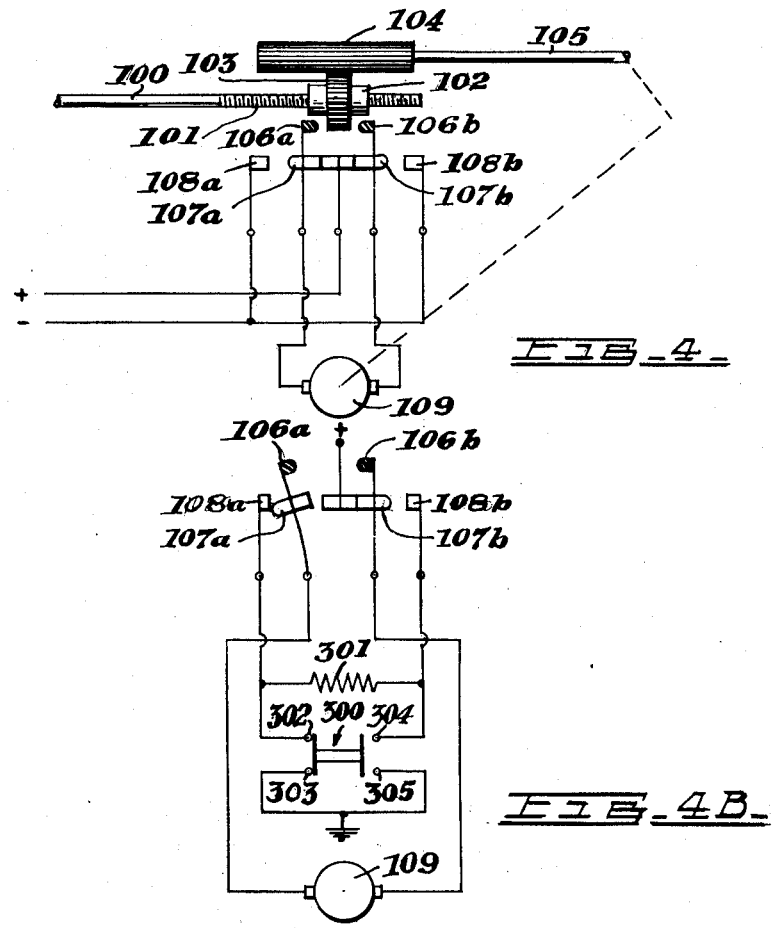
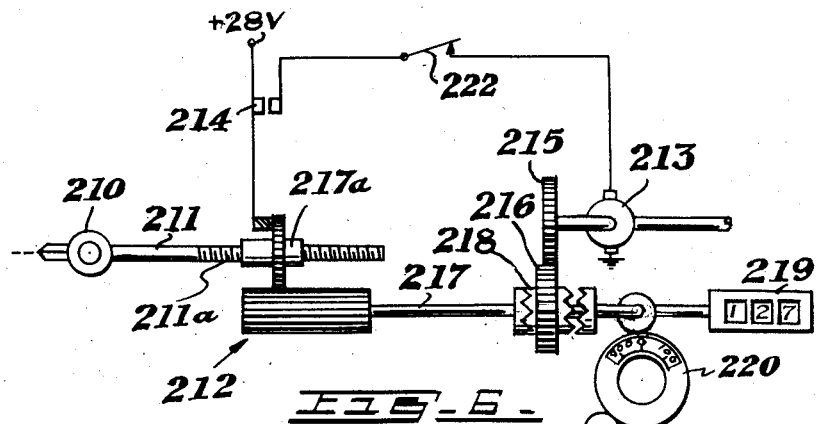

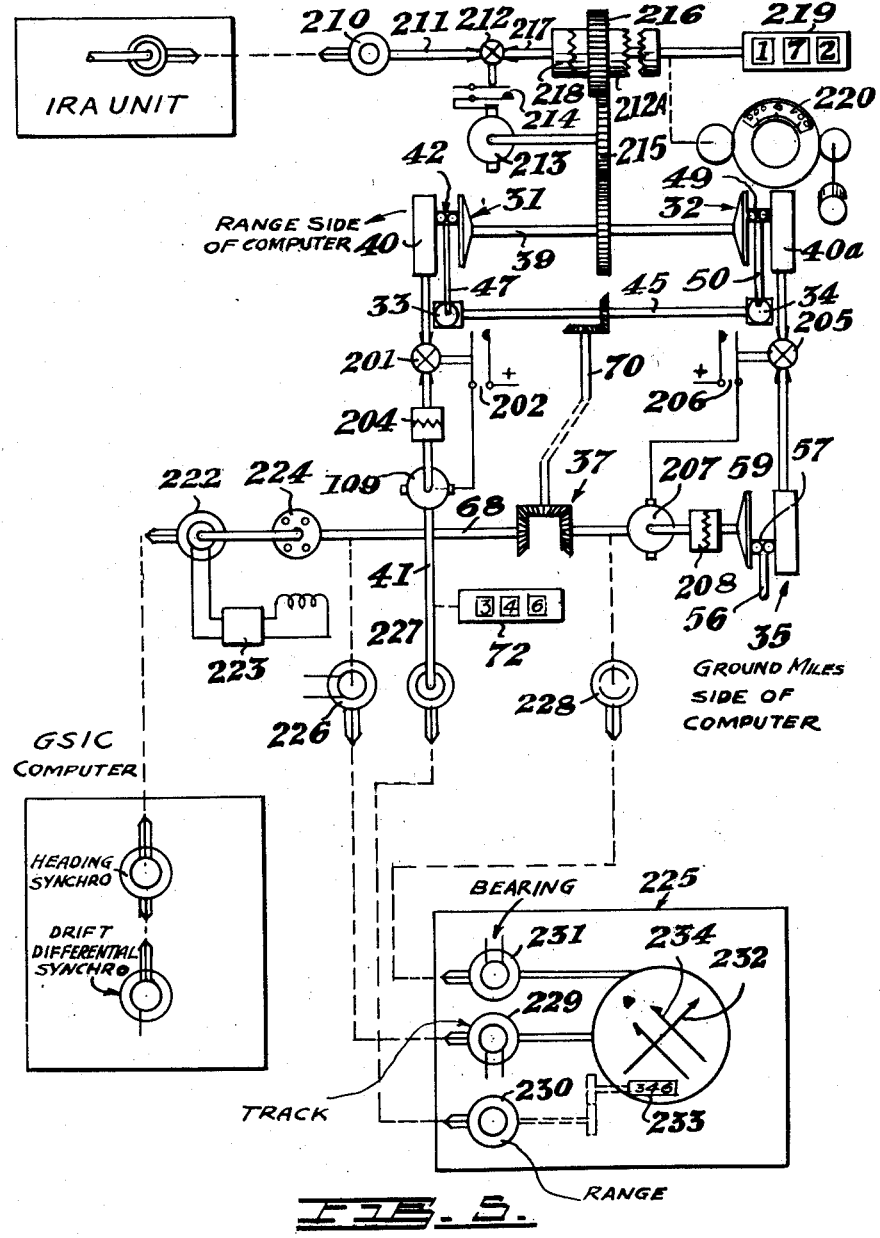

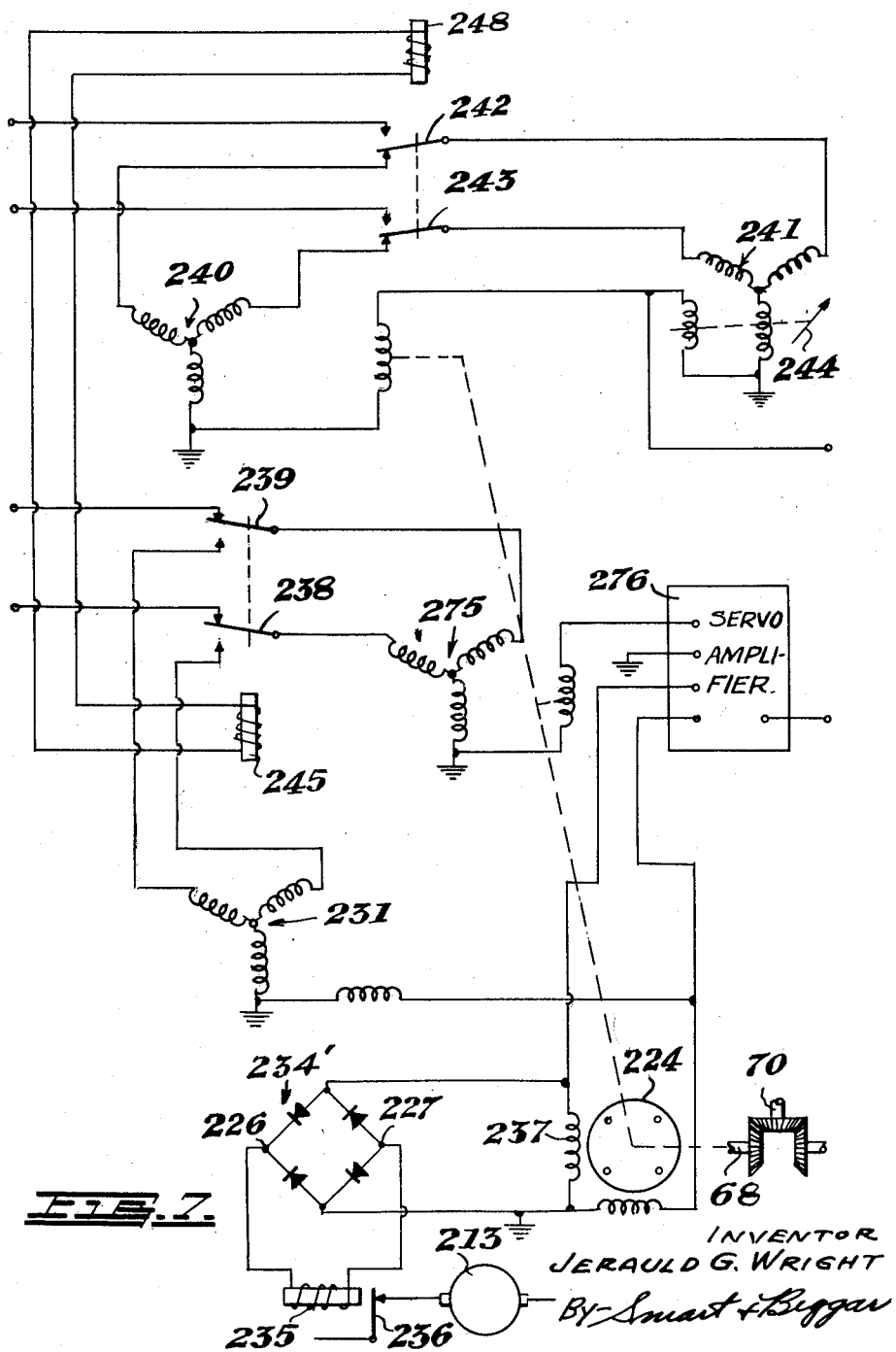

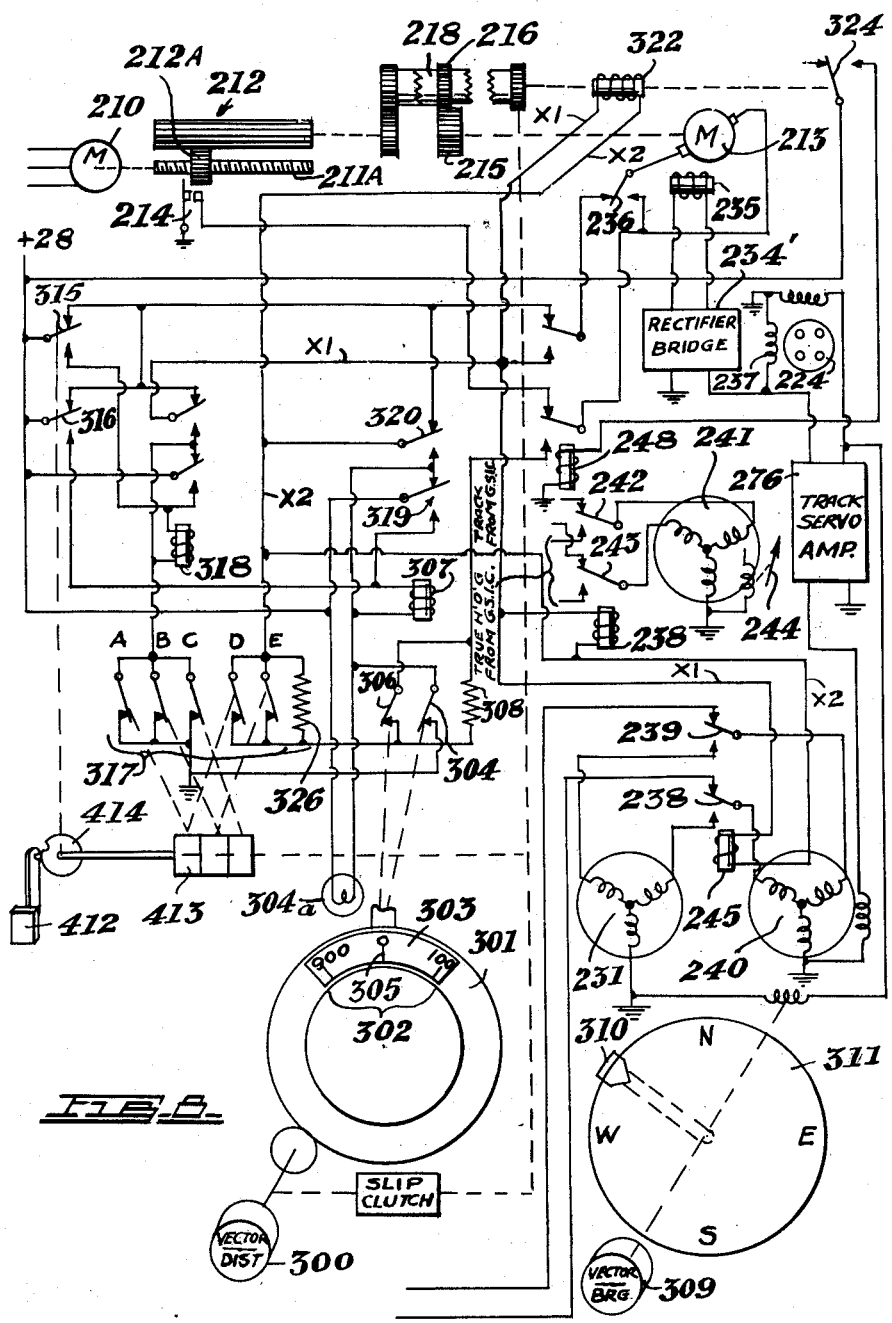

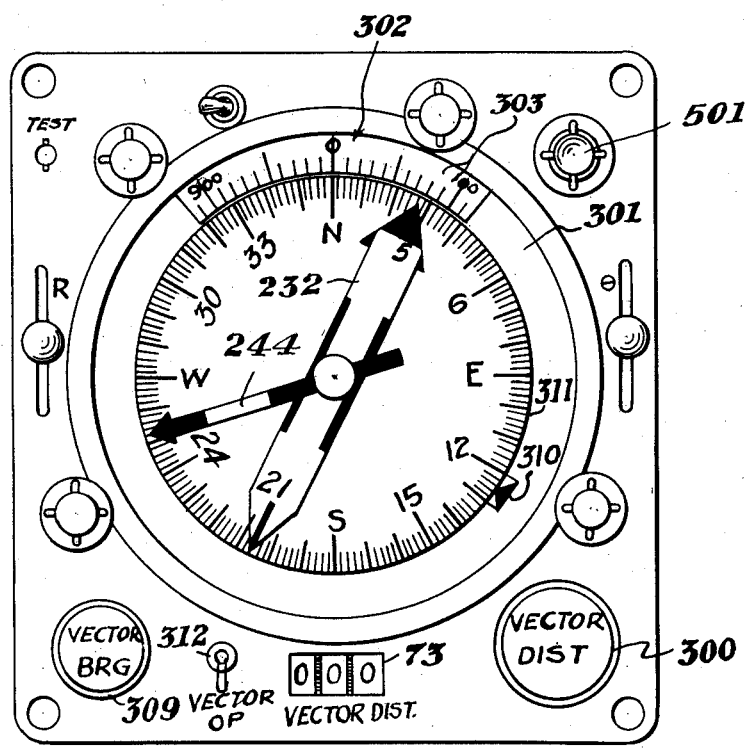
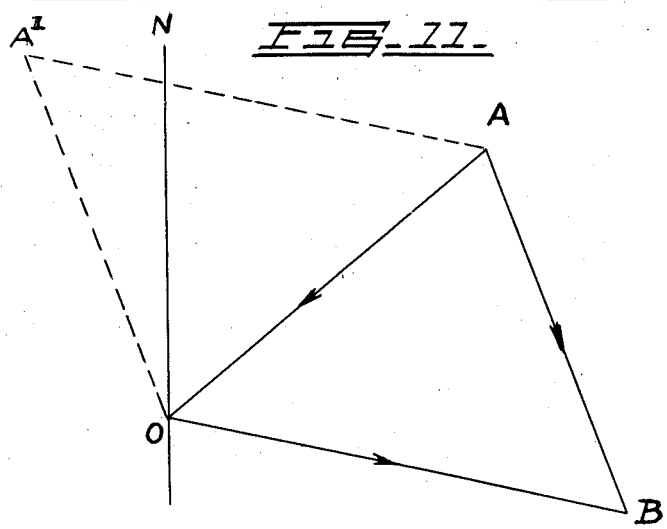

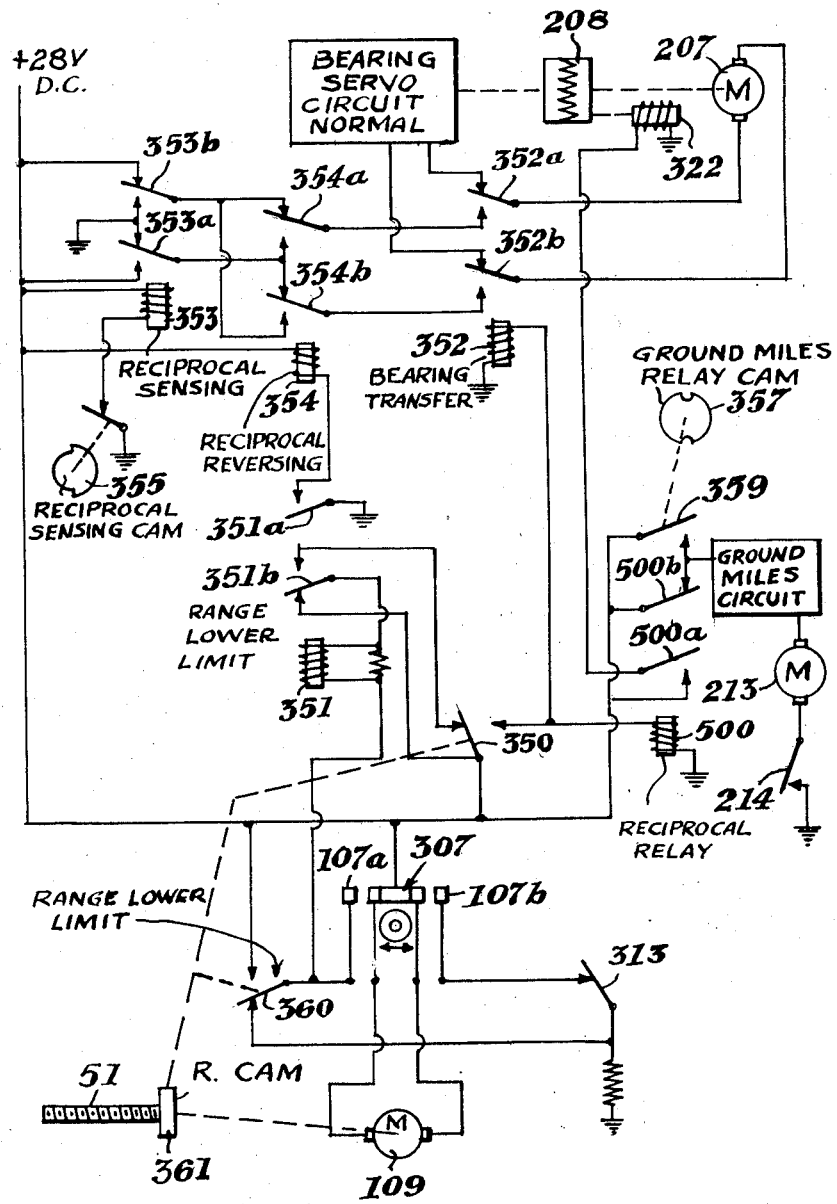

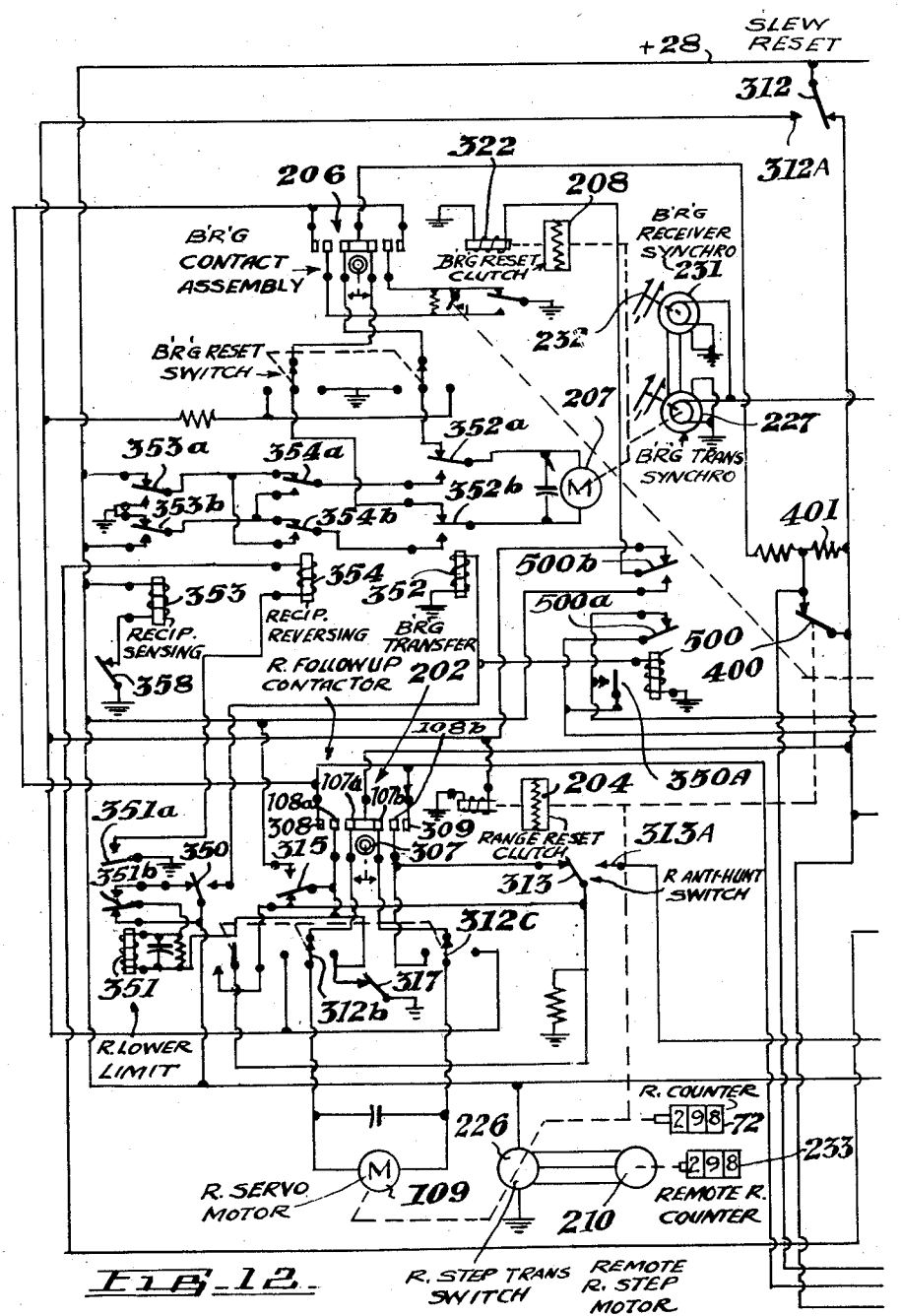

Nov. 3, 1959          J. G. WRIGHT          2,911,143
           MEANS FOR POLAR COORDINATE NAVIGATION
Filed Nov. 17, 1954                    12 Sheets-Sheet 12

INVENTOR.
JERAULD. G. WRIGHT
BY- Smart Biggar
ATTORNEYS

2,911,143

MEANS FOR POLAR COORDINATE NAVIGATION

Jerauld George Wright, Ottawa, Ontario, Canada, assignor to The Minister of National Defence of Her Majesty's Canadian Government, Ottawa, Ontario, Canada Application November 17, 1954, Serial No. 469,355

14 Claims. (Cl. 235—61)

This invention relates to navigational computers, and more particularly, it relates to a computing mechanism particularly adapted for use in high speed aircraft, which mechanism accepts input data consisting of distance travelled and direction of travel and indicates continuously in polar coordinates the position of the aircraft relative to a datum point or base.

The immense speeds attainable in modern aircraft have created a pressing need for navigational aids capable of relieving the pilot and/or the navigator from the mental attention normally required to work out the position of the aircraft in X and Y coordinates and then calculate the course and distance to base. The principal requirements of such an instrument are that it shall be compact, light in weight and sufficiently accurate within the flight range of the aircraft to be capable of guiding the pilot back close enough to his base to enable the use of short range low power radio aids, locally based radio aids or visual recognition. Various attempts have been made to provide such an instrument but such attempts have generally approached the solution of the navigational problem by first of all calculating the position of the aircraft in X and Y coordinates and then re-computing the X and Y solution into a distance and bearing to base. This has led on the one hand to the instrument being unnecessarily bulky and on the other hand to such complications in the pilot's presentation that a considerable amount of the benefit of the instrument is lost.

It has for various reasons been considered impractical to solve the navigational problem directly in polar coordinates, largely, I believe, because those seeking a solution to the problem have failed to appreciate the essentials of a satisfactory solution both from the point of view of the pilot or navigator and from the point of view of serviceability, reliability and aircraft design. To begin with, a successful instrument of the above character must operate by dead-reckoning from sources of information available within the aircraft. The information thus available may originate from various sources such as weather forecasts issued in advance of take-off, meteorological information supplied by radio during flight or information obtained directly by instruments contained within the aircraft, for instance by means of "Doppler" radar, compasses, air speed indicators and the like. The accuracy of such information varies from time to time, particularly in the case of meteorological reports, and considerable error may thus be introduced into the dead-reckoning calculations of the instrument. It is, therefore, a prime requisite of such instruments that they be capable of being reset rapidly when a fix of the aircraft's position indicates that dead-reckoning error exists without introduction of further error due to the time required in accomplishing the reset.

Further, since it may be desired to home the aircraft on any one of a number of bases, or in the case of naval aircraft on a carrier rendezvous, it is desirable that the instrument should be one which is capable of adapting itself to changes of base without requiring calculations to be made by the pilot or navigator and without introduction of error. Since space and weight are at a premium in military aircraft, the instrument must be both compact and light. In addition, it must be rugged to withstand the forces exerted by manoeuvering of the aircraft, and at the same time it must give continuously reliable operation with a minimum of servicing, and its operation must be such that it can never give a false indication when it appears to be in working order.

Bearing the above mentioned requirements in mind, I have found that by conceiving of the instrument simply as a mechanism for resolving directional and distance data into polar coordinate information and providing other means in advance of the instrument for putting the input information into suitable analogue form, a highly versatile instrument which solves the navigational problem directly in polar coordinates can be provided, which instrument possesses many outstanding advantages absent in navigational instruments previously proposed.

The present instrument is adapted to receive as input data an analogue of distance travelled over the ground (i.e. "ground miles") and an analogue of the change of direction of travel over the ground (said direction being referred to in navigational language as "track").

According to the present invention, the instrucent comprises resolving means into which is continuously set as a first input the ground miles analogue referred to above and into which is continuously set as a second input a directional factor which is derived from the "track" analogue and the outputs of the resolving means, in the following manner:

The resolving means is first of all arranged to split the ground miles analogue into two components or vector analogues, one in the direction of a datum point (or base) and one at right angles to the said direction. The change of range to the datum point ($r$) is, therefore, directly represented by the first output mentioned while the second ouput above mentioned represents change in what might be referred to as the "arc" momentarily being travelled. Now "arc" divided by radius is equal to angle subtended, and accordingly the second output above referred to is fed into a divider as the enumerator and the first output above referred to is fed into the divider as a divsior to give an output from the divider which is analogous to change in the direction to the datum point (or base). This output ($\theta$) is then fed into a subtractor where the second input to the instrument, i.e. the "change of track" analogue (T) is subtracted from it and the output of the subtracting means, which is analogous to change of the angle between the direction of travel and the direction to the datum point, is supplied as the second input to the resolving means.

A continuous showing of the total distance to the datum point (or base) and the direction to the datum point (or base) is indicated on suitable dials or counters connected so as to cumulatively indicate the analogue changes of the first output from the resolving means (which is the distance to datum point, or R) and the changes in the analogue which is the output of the divider (which when referred to true north represents the bearing to the datum point or $\theta$).

Operation of the computer of the invention involves the use of four individual systems in interconnected relationship and several additional sub-systems which are formed partly by components of the above four systems and which are capable upon actuation of certain switches of forming independent systems for purposes of carrying out certain special operations with the computer of the invention.

The four main systems referred to above are as follows:

*(1) The ground miles system*

This system has the basic function of receiving ground miles data as an electrical signal from a suitable source within the aircraft and converting the electrical signal into a shaft rotation of sufficient torque to drive the mechanical computer elements associated with the input shaft of the computer. Provision is made in the ground miles system for temporary storage of incoming data in an electrically controlled mechanical "memory" and the system is adapted so that the ground miles data can be fed to the computer from an alternative source during alternative base operation when it is desired to shift the base with respect to which the computer indicates range and direction.

(2) The track system

This system has as its function the acceptance of track data as an electrical signal from a suitable source within the aircraft and the conversion of it into a shaft rotation which can be fed into the computer as its second input. Provision is made in the track system for the acceptance of data from an alternative source when shifting over to alternative base operation, and preferably the track system also includes a means of providing a repeater which is situated in the pilot's instrument panel with an indication of true heading during such periods as the track system is accepting track data from the alternative source during alternative base operation.

(3) The range system

The function of this system is to provide torque amplification on the range side of the mechanical computer. The system consists basically of a follow-up servo arrangement controlled by a limit switch, and provision is made for the declutching of the output and input sides of the servo arrangement for purposes of resetting the range indicator to a desired value without reference to the incoming range data which is provided by the first ball disc multiplier output shaft.

(4) The bearing system

The function of this system is to provide torque amplification on the bearing side of the computer, and it consists basically of a follow-up servo arrangement, a clutch, and a limit switch. It is very similar to the range system, and provision is made for declutching while the track indicator is being set to a desired value.

The sub-systems which provide control circuits for special operation of the computer include—

(a) The alternative base sub-system which provides a control circuit whereby the computer may during flight be made to compute range and direction with respect to a new datum point other than that with respect to which the computer is already computing the polar coordinates of range and bearing.

(b) The automatic reciprocal sub-system which comes into operation at a predetermined range when the aircraft is flying a course which will carry it over the base or close to it and which permits the aircraft to fly close to base or directly over it without the introduction of a computing error which is greater than can be accepted.

(c) The reset sub-systems which provide control circuits which enable the range and bearing systems of the computer to be reset during flight to coordinates obtained by a "fix" without the loss of dead-reckoning data.

In its preferred embodiment, the computer of the present invention is adapted for use in association with a data source referred to as the ground speed and interception computer (GSIC) which is a computing device containing an automatically actuated mechanical analogue triangle. The GSIC receives as input true air speed from a conventional TAS unit and true heading from a conventional remote indicating compass. Wind speed and wind direction are set manually into the GSIC on the basis of the latest information available. The outputs of the GSIC are track and ground miles travelled as a synchro signal and as a shaft rotation. Instead of setting in wind speed and wind direction manually, the GSIC may be slaved to a conventional "Doppler" radar unit in a manner which provides continuous setting of wind data. The GSIC and its operation described in copending application Serial No. 459,574, filed October 1, 1954.

Since space is limited in the cockpit instrument panels of most aircraft, and in order to provide convenience in electrical connection and versatility of mounting position as well as access for servicing purposes, certain components of the electrical circuits in the GSIC and the computer of the present invention (which is referred to briefly as the R$\theta$ computer) are mounted together in a separate unit which contains all of the amplifiers of both instruments. This unit is referred to briefly as the integrator relay and amplifier unit (IRA for short). The total weight of the whole system embodying the GSIC unit, the IRA unit, the R$\theta$ unit and the remote indicator for the R$\theta$ unit is approximately 42 pounds from which it will be observed that the navigational system afforded is exceedingly light and compact, taking into account the varied functions which it is capable of performing.

The invention and its manner of operation will be more fully understood from a reading of the following detailed specification wherein reference is had to the accompanying drawings.

Figure 2:
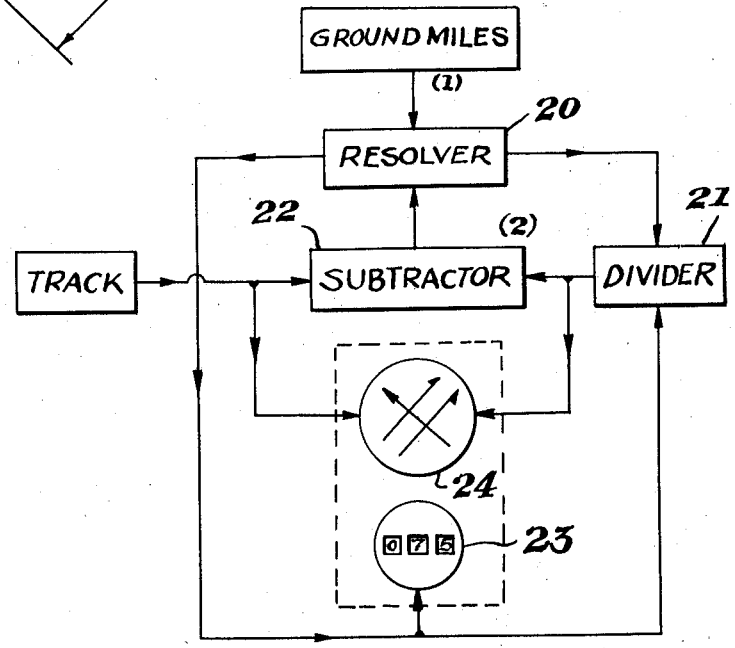
Figure 4A:
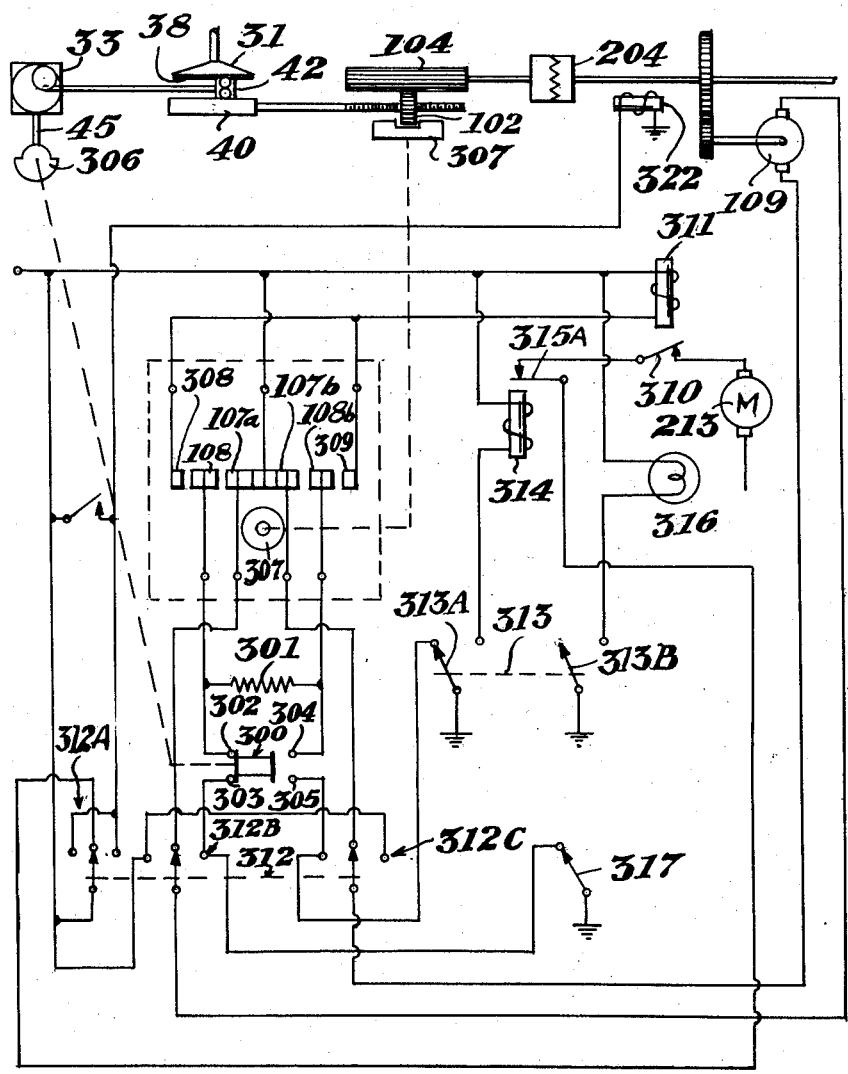
Figure 13:
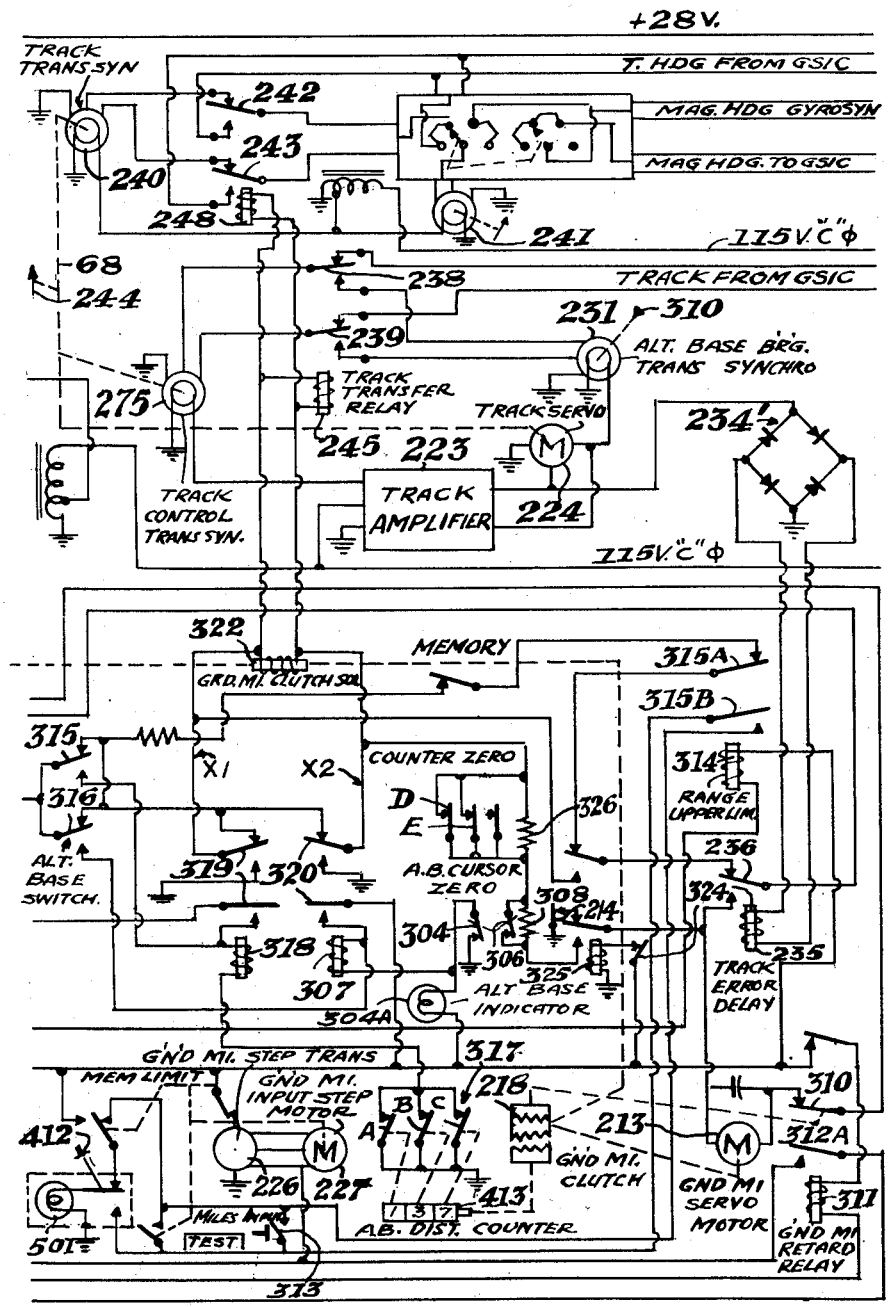
Figure 14:
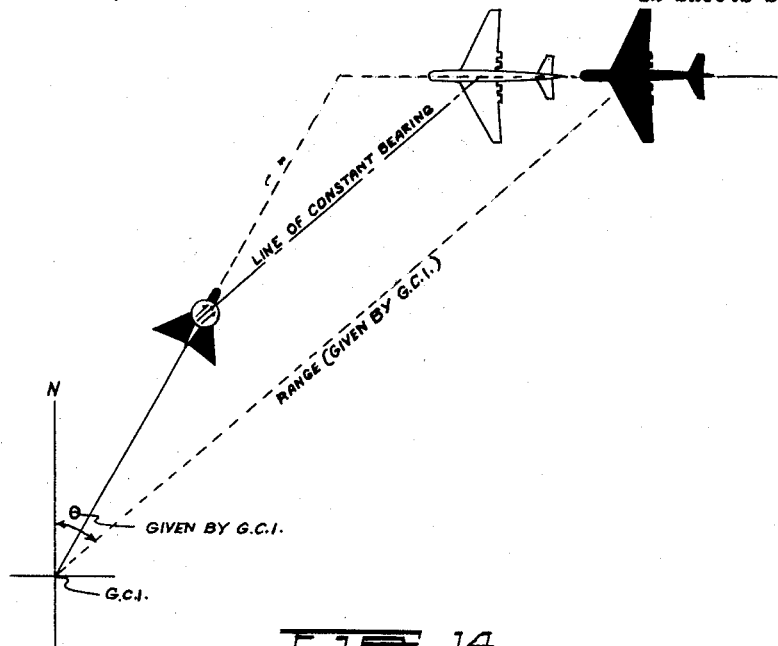
Figure 15:
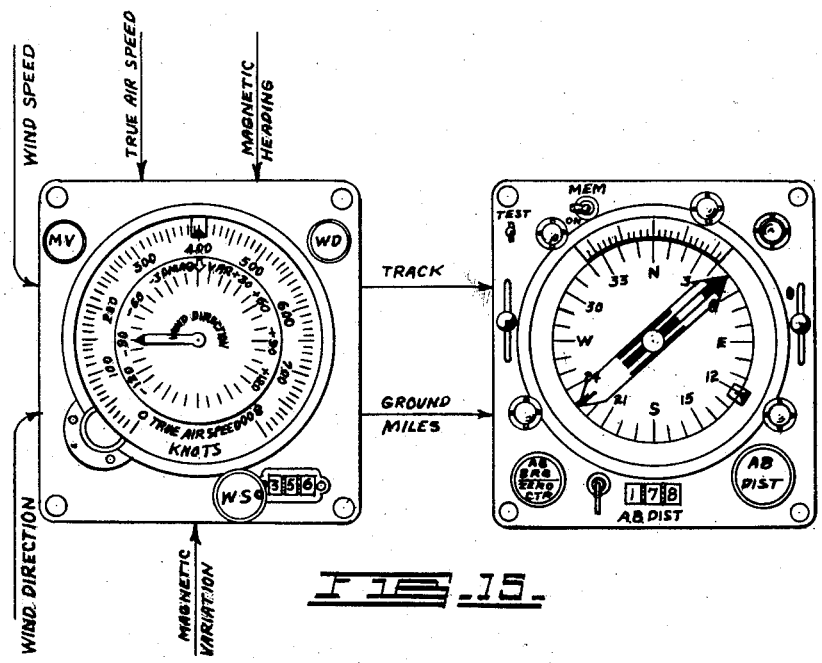

In the drawings,

Figure 1 is a vector diagram illustrating the navigational problem which the apparatus of the present invention is primarily intended to solve, Figure 2 is a diagrammatic illustration of the general computing circuit, Figure 3 is a diagrammatic illustration of a preferred form of computing circuit according to the invention wherein the computing operations are carried out mechanically, Figure 4 is a functional diagrammatic view of the preferred form of servo arrangement as used in the invention, Figure 4A is a diagrammatic view of a control circuit governing the ground miles and bearing circuits, Figure 4B is a diagrammatic view of the sensing switch circuit which controls the range servo motor, Figure 5 is a functional diagrammatic view of a servo operated mechanical computer circuit according to the invention, Figure 6 is a diagrammatic view of the ground miles servo, Figure 7 is a diagrammatic view of the track servo circuit, Figure 8 is a diagrammatic view of the alternate base circuit, Figure 9 is a geometric layout of the alternate base problem, Figure 10 is a diagrammatic view of the reciprocal circuits, Figure 11 is an elevation of the front face of the R$\theta$ instrument, Figures 12 and 13 are diagrammatic layouts of the integrated electric and mechanical circuits, Figure 14 illustrates the geometry of the interception problem, Figure 15 is a block diagram of the computer used in association with a source of ground miles and track analogues.

Referring now more particularly to the drawings, the navigational problem solved by the apparatus of the present invention is illustrated as a vector diagram in Figure 1. Referring to this diagram, let it be assumed that the aircraft is flying along a path represented by the dotted line A in Figure 1 and that the following symbols represent respectively the following data:

O—Position of base from which the aircraft is operating.
P—Position occupied by the aircraft at a given time $t$.

$P_1$—Position occupied by the aircraft a short time later, $t_1$.
T—Track (true).
S—Aircraft ground speed.
$\theta$—Bearing (true) of base from aircraft.
$\theta_0$—Bearing (true) of base at start of computation.
R—Range of base from aircraft.
$R_0$—Range of base at start of computation.
$R_1$—Range of base after interval of time $t$ to $t_1$.

Then the line $PP_1$ represents the distance travelled during the interval of time $t$ to $t_1$.

Now distance travelled equals the product of speed and time interval, i.e., $$PP_1 = S(t-t_1) = Sdt$$

when the interval is short enough to permit use of calculus notation.

This distance may be resolved into two components, one along the line of bearing and one perpendicular to it, $LP_1$ and PL respectively. From the diagram it is apparent that:

$$\text{Angle } P_1PL = \theta - T - 90° \quad (2)$$

Now $$PL = PP_1 \cos(\theta - T - 90°)$$
$$= Sdt \sin(\theta - T) \quad (3)$$

and $$LP_1 = PP_1 \sin(\theta - T - 90°)$$
$$= -Sdt \cos(\theta - T) \quad (4)$$

During the time interval $dt$, the range changes by $dR$ and the bearing by $d\theta$, where $$PL = Rd\theta \quad (5)$$

and $$LP_1 = dR \quad (6)$$

Thus $$Rd\theta = Sdt \sin(\theta - T)$$

and $$dR = -Sdt \cos(\theta - T)$$

Whence $$\frac{dR}{dt} = -S \cos(\theta - T) \quad (7)$$

and $$\frac{d\theta}{dt} = \frac{S \sin(\theta - T)}{R} \quad (8)$$

To compute the values of R and $\theta$, Equations 7 and 8 must be integrated with respect to time. Thus:

$$R = R_0 + \int_0^t dR = R_0 - \int_0^t S \cos(\theta - T) dt \quad (9)$$

and $$\theta = \theta_0 + \int_0^t d\theta = \theta_0 + \int_0^t \frac{S \sin(\theta - T)}{R} dt \quad (10)$$

Equations 9 and 10 are the equations which are solved by the apparatus of the invention.

Referring now to Figure 2, which is a diagrammatic illustration of the general computing circuit of the invention, the resolver 20 is arranged to accept as input an analogue of S (i.e. ground miles travelled) and a directional factor which is the analogue of the angle $(\theta - T)$.

The resolver 20 splits the ground miles analogue into two vector analogues, one in the direction of the base O and the other at right angles to the direction to the base O. By multiplying the ground miles input by the cosine of the angle $(\theta - T)$ on the one hand to give a first output equal to $-S \cos(\theta - T)$ (the minus sign may be disregarded as its minus sign has no significance in mechanical analogue rotations), the resolver provides an output analogous to change of R (see Equation 7). At the same time the resolver independently multiples the ground miles analogue(s) by the sine of the angle $(\theta - T)$ to give a second output which is analogous to $$\frac{Rd\theta}{dt}$$

(see Equation 8).

The two outputs of the resolver 20 are now fed into a divider 21, the first output (R) being the divisor and the second output $$\left(\frac{Rd\theta}{dt}\right)$$

being the enumerator. Thus, the rate of change of the output of the divider is $$\frac{d\theta}{dt}$$

(or the analogue of the rate of change of the angle $\theta$). This last output is fed into a subtractor 22 in which the analogue of change of track $$\left(\frac{dT}{dt}\right)$$

is subtracted from it to give an output which is analogous to change of the angle $(\theta - T)$, and it is this output which is now fed to the resolver 20 as the second input thereto.

Suitable means are connected into the first output line of the resolver 20 to provide a running indication of the value of R and may suitably take the form of the counter 23. A dial would, of course, be equally suitable. Similarly, a suitable dial or counter is connected into the output from the divider 21 to indicate the value of the angle $\theta$, such as the dial indicator 24.

It will be appreciated that the main elements of the computing mechanism, which consist of the resolver 20, the divider 21 and the subtractor 22, may take many different forms since the functions performed by each of these components are functions which can be performed successfully by any other analogue means, for example, electronic, electrical, hydraulic, pneumatic or mechanical, or various combinations of the aforesaid means. Each particular means has its own advantages and disadvantages, and the selection of particular circuit components is a matter which must be determined having regard to all the factors involved, which include the characteristics of the complete navigational system of which the computer is to form a part as well as service factors related to specifications of weight, volume, accuracy and reliability.

For various reasons, some of which will be discussed hereinafter, I prefer to carry out the operations of resolving, dividing and subtracting mechanically with the motivation of the components being effected and controlled by electrical means. A preferred mechanical computing circuit according to my invention is illustrated diagrammatically in Figure 3. In this case, the inputs to the computer are expressed as a shaft rotation, the ground miles input being a rotational rate proportional to ground speed and the track input being a rotational rate proportional to change of track. It will be observed that when the rotational rate is proportional to a speed in the above manner the angular position of the shaft at any instant is proportional to the cumulative distance travelled from time $t^0$ to time $t^1$ insofar as the ground miles input is concerned, whereas the position of the track input shaft at any instant simply represents track.

Referring to Figure 3, the resolving means 20 of Figure 2 are here composed of the two ball-disc multipliers indicated generally at 31 and 32 and the two sine-cranks indicated generally at 33 and 34. The dividing means 21 of Figure 2 consist of the ball-disc multiplier 35 and the lead screw 36, and the subtractor 22 of Figure 2 is simply the mechanical differential 37.

The ball-disc multipliers and sine-cranks are conventional, mechanical computer components. A ball-disc integrator is an infinitely variable speed changing mechanism in which the relative speeds of two shafts carrying a disc and a cylinder respectively are controlled by the position of a third member. This third member is a ball carriage which positions two steel balls between the disc and the cylinder. The balls couple the disc to the cylinder by rolling action. Referring to the ball-disc multiplier 31, it will be seen that it consists essentially of the disc 38 which is fixed to the shaft 39, the cylinder 40 which is fixed to the shaft 41, and the ball carriage 42 which positions the balls 43 and 44. It will be at once apparent from a consideration of Figure 3 that the relative speed of rotation of the shafts 39 and 41 will depend upon the position of the ball carriage 42 between the disc 38 and the cylinder 40, and will vary from a maximum positive quantity through 0 to a maximum negative quantity as the ball carriage 42 is moved from one periphery of the disc 38 past the centre of the disc to the other periphery.

A sine-crank converts a shaft rotation into linear travel of a pin in such a way that pin displacement from the centre of the shaft is proportional to the sine of the shaft angle measured from its reference point. The sine-cranks 33 and 34 have their shafts connected by the sine-crank input shaft 45 in such a way that the displacement of the pin 46 of the sine-crank 33 which positions the ball carriage 42 by means of the connecting link 47 is proportional to the cosine of the angle $(\theta-T)$ while the displacement of the pin 48 of the sine-crank 34 which positions the ball carriage 49 of the ball-disc multiplier 32 through the connecting link 50 is proportional to the sine of the angle $(\theta-T)$. Since $\cos(\theta-T-90°)=\sin(\theta-T)$, it will be observed that to effect the above positioning it is merely necessary to position the pin of the sine-crank 34 90° in advance of the pin 46 of the sine-crank 33.

The lead screw 36 is, as its name implies, simply a screw 51 which is turned in 1–1 relationship with the shaft 52 and the shaft 41 through bevel gear sets 53 and 54 and upon which rides the non-rotatable nut 55. It will be observed accordingly that the position of the nut 55 on the screw 51 is proportional to R (or range to base). The nut 55 through link 56 controls the position of the ball carriage 57 of the ball-disc multiplier 35 whose cylinder 58 is rotated by the output shaft 59 of the ball-disc multiplier 32, and thus the rotational speed of the disc 60 and the output shaft 61 of the ball-disc multiplier 35 will be proportional to the rotation of the shaft 59 divided by R, the ball-disc multiplier 35 in this case acting as a divider rather than a multiplier.

The mechanical computing system illustrated in Figure 3 operates as follows. The ground miles input shaft 62 rotates at a rate which is proportional to ground speed and through the bevel gears 63 drives the shaft 39 which carries the discs 38 and 38a of the ball-disc multipliers 31 and 32 respectively at a rate which is proportional to ground speed. The disc 38 through balls 43 and 44 drives the cylinder 40 to impart to the shaft 41 a rate of rotation which is proportional to $$S\cos(\theta-T)=\frac{dR}{dt}$$

This rotation is carried around through the gears 53 to the shaft 52 and the gears 54 to the lead screw 51 and the integrated value of $$\frac{dR}{dt}$$

between time $t^0$ and time $t^1$ (which is the range to the base, or R) is represented by the position of the nut 55 on the lead screw 51. The nut 55 positions the ball carriage 57 of the ball-disc multiplier 35.

The disc 38a of the ball-disc multiplier 32 through the balls 43a and 44a drives the cylinder 40a to impart to the shaft 59 and the cylinder 58 of the ball-disc multiplier 35 a rate of rotation which is proportional to $$S\sin(\theta-T)=\frac{Rd\theta}{dt}$$

In driving the disc 60 through the balls 64 and 65 which are positioned in accordance with the position of nut 55 on the lead screw 51, the rate of rotation of the cylinder 58 is divided by R to impart to the output shaft 61 a rate of rotation which is proportional to $$\frac{d\theta}{dt}$$

The shaft 61 carries the gear 66 which forms one input component of the differential 37. The other input component is the gear 67 which is driven by the track input shaft 68 at a rate which is proportional to $$\frac{dT}{dt}$$

in a direction such that the output component of the differential 37 which is constituted by the gear 69 will be rotated and will drive the output shaft 70 with a rate of rotation proportional to $$d\frac{(\theta-T)}{dt}$$

It is to be noted, however, that the angular position of the shaft 61 and the angular position of the shaft 68 represent the angle $\theta$ and the angle T respectively and that the angular position of the shaft 70 represents the angle $(\theta-T)$. In driving the shaft 45, therefore, through the bevel gears 71, the shaft 70 positions the shaft 45 in a position which represents the angle $(\theta-T)$, and consequently positions the sine-cranks 33 and 34 in positions such that the displacements of their respective pins 46 and 48 are proportional to $\cos(\theta-T)$ and $\sin(\theta-T)$ respectively.

In order to furnish the pilot or navigator with the desired information, a range counter 72 is provided which is driven by the shaft 52 through the gears 73 and therefore continuously shows the range to base or R. Similarly, a dial 74 is provided which is equipped with the double pointer 75 which is driven directly from the shaft 61 through the gears 76 and the shaft 77 and indicates the bearing of the base from the aircraft, or $\theta$. At the same time, a second pointer 78 is provided on the same dial which is driven directly from the shaft 68 through the gears 79 and shaft 80 and indicates the direction of the aircraft's flight (i.e. the track T).

The pilot or navigator is thus furnished with a continuous indication of his distance from base, the bearing which must be flown to arrive at the base and the track upon which the aircraft is presently flying. In order to return to base, all that is necessary is to change the heading of the aircraft until the pointer 78 lies squarely in the centre of the double pointer 75 and continue flying until the range counter 72 approaches zero.

The mechanical computing system described above has many advantages from the point of view of accuracy, compactness and service reliability. It will be appreciated, however, that when the system is actuated automatically, accuracy can only be maintained in the absence of slip in the ball-disc multipliers and mechanical distortion of the other computing component parts. It is, therefore, apparent that provision must be made for the elimination insofar as is possible of any load upon the mechanical computing components.

While various servo mechanisms are available in the art which are suitable for this purpose, I prefer to use a simple combination of a lead-screw, a limit switch, and a follow-up D.C. motor, which combination I refer to herein as a "lead-screw differential." This arrangement is illustrated functionally in Figure 4. The input shaft 100 is provided with screw threads 101 upon which is threaded the nut 102 to which is secured the gear 103 which is in mesh with the elongated pinion 104 mounted on the output shaft 105. Rotation of the input shaft 100 merely advances or retards the nut 102 along the screw threads 101 because the nut is held stationary by the gear 103 which is in mesh with the pinion on the loaded output shaft 105. As the nut 102 moves along, it carries one of the spring mounted contact arms 106a or 106b along until electrical contact is established either between contact points 107a and 108a or 107b and 108b. This energizes the D.C. motor 109 in one direction or the other which drives the output shaft and its load and continues to drive it until the nut 102 has been driven back to its central position on the screw threads 101 as the pinion 104 rotates the gear 103.

This arrangement has the advantage that it is simple and positive in operation, while being practically impossible to jam. In addition, by the insertion of a clutch between the elongated pinion 104 and the servo motor 109, the output side may be declutched from the input side for brief intervals while the indicator is being reset. During the reset operation the input is temporarily stopped and diverted onto a "memory" as is hereinafter described, so that normal operation is resumed without introduction of error.

The use of this type of servo arrangement in conjunction with the mechanical computing circuit illustrated in Figure 3 is shown in the functional schematic of Figure 5, which also shows the various input and output data links. In this figure the main mechanical computing components are indicated by the same reference numerals as in Figure 3.

*The range system*

The range side of the computer is provided with a lead screw differential servo consisting of the lead screw 201 the limit switch 202 and the D.C. follow-up motor 109. Interposed between the motor 109 and the output of the lead screw 201 is the solenoid operated clutch 204.

In order to carry out its function effectively, the limit switch 202 is especially adapted for the particular operating conditions prevailing on the range side of the computer. It will be apparent from a reference to Figure 4A which is a schematic of the layout of the limit switch 202 that the motor-volts to error relation during operation of the differential and contact assembly will comprise two principal zones. Firstly, there will be a region of small error within which the motor 109 is not energized which will be referred to as the "dead-zone." On either side of the dead-zone is a region of large error in which full voltage is applied to the motor 109 in the appropriate sense to reduce the error. In addition, the system, like all systems of this type is subject to hysteresis and backlash which is the sum of all mechanical slop or lost motion in the servo loop and which results in the motor always being de-energized at a smaller value of error than that which is required to energize it in the first instance. In order to provide close follow-up action and hence small static error, it is desirable that the dead-zone should be as small as possible. On the other hand, to ensure rapid correction of follow-up errors when the input shaft turns, a relatively high torque motor is required. These two requirements are contradictory in nature. A high torque motor, may, when energized, accelerate the load to such a speed that it coasts past zero error point to the point of torque reversal. Upon reversing, it may overshoot the zero error point and be energized in the original direction. Thus, the normal result would be a steady "hunting" condition in which the motor and load constantly oscillate back and forth past the zero error point. Hysteresis aggravates a hunting condition of this nature. Such oscillation is capable of elimination by mechanical damping, but known solutions of this problem mechanically are either unduly complicated or are relatively unreliable. Accordingly, electrical damping is employed in the form of an anti-hunt circuit.

Since, during flight, ground miles are fed steadily into the computer, the ball disc multiplier on the range side will operate at a steady rate. Generally speaking, during any given flight, the range will increase from zero to a maximum and finally return again to zero. In general, therefore, the motion of the range servo will be unidirectional for appreciable periods of time. The limit switch circuit is, therefore, arranged in such a manner that full torque is applied to the servo motor in the direction in which the range is being altered while should and overshoot occur so that the servo motor is energized in the opposite direction, a reduced torque is applied capable only of shifting the load back to the dead-zone but incapable of accelerating the load sufficiently to cause a second overshoot. How this is accomplished is illustrated in Figure 4A. The disc in the ball-disc multiplier 31 always turns in the same direction during normal operation because during flight the ground miles travelled are always increasing. Range, on the other hand, will increase or decrease depending upon the position of the sine crank 33, the sense of change of range being reversed every time movement of the sine crank 33 moves the ball carriage 42 across the centre of the disc 38. Advantage is taken of this fact to actuate the sensing switch 300 by means of a 180° segment cam 306 mounted on the sine crank shaft 45. This sensing switch 300 places a resistance in the power line supplying the servo motor which leads from the contacts of the limit switch on the side of the dead-zone remote from that towards which the nut 102 is during any period seeking to advance as a result of input fed from the cylinder 40. A simplified schematic of the arrangement of the anti-hunt circuit is shown in Figure 4B from which it will be observed that when the normal direction of motion of the nut 102 is to the left so that contact 107a is driven against contact 108a the sensing switch 300 establishes communication between the terminals 302 and 303 so that the full error voltage is applied against the terminals of the range servo motor 109. However, it will be observed that should the servo motor overshoot so that the contact 107b is driven against contact 108b, as long as the sensing switch 300 is in the position shown, the voltage applied across the terminals of the range servo motor 109 will be less than the full supply voltage since the anti-hunt resistor 301 will be in the supply voltage circuit. As soon as the range begins to alter in the opposite sense, the cam 306 on the sine crank shaft 45 throws the sensing switch 300 to the position where it opens contacts 302 and 303 and establishes communication between contacts 304 and 305 permitting full voltage to be applied to the servo motor 109 when it is moving the range shaft in the new direction.

In high speed operation, computing speed may be such that the range servo motor 109 even when developing full torque in the preferred direction may not be able to keep up with the data fed to the lead screw differential by the cylinder 40. Should this condition occur, the nut 102 (see Figure 4a) and the contact actuator 307 will move further and further from centre and could damage the contacts 108a and 108b or place load on the mechanical computing system which would introduce slip and computational errors. To provide against this contingency, an outermost pair of contacts 308 and 309 are provided which when contacted with the contactors 108a or 108b open a switch in the ground miles servo motor supply line until the range servo motor 109 has caught up with the input data which is being fed to the lead screw differential. This switch 310 is actuated by the ground miles retard relay solenoid 311.

This speed limiting feature reduces the speed of the computer operation but prevents computational error from being introduced, and since in operation the periods during which it will come into play are short, the reduction in speed of computer operation is acceptable. In addition, it also provides protection to the computer mechanism in the event of mechanical jamming of the output shaft of the servo.

Since the maximum range which can be accommodated by the computer is determined by the length of the lead screw 51 which controls the position of the ball carriage 57 of the ball-disc multiplier 35 (see Figure 3), it is necessary, to avoid damaging the computer, to prevent further ground miles input to the computer whenever the range exceeds the capacity of the lead screw 51. Accordingly, by means of a microswitch and cam arrangement on the lead screw 51 and its associated nut, the range upper limit switch 313 is actuated whenever the range has reached its upper limit and contact 313A of this switch completes the circuit through the range upper limit relay 314 opening the switch 315A in the ground miles motor circuit, stopping the ground miles motor 213 and diverting incoming ground miles data on to "memory." At the same time, switch 315B completes a circuit through the limit indicator light 501, which is situated on the front face of the computer and warns the navigator that maximum range has been exceeded. The range lower limit switch 317 is also indicated on Figure 4A and is operated at a range of about one-half mile by another cam on the range lead screw 51. Its function is in connection with automatic reciprocal operation when the aircraft is flying over or very close to base and will be described in detail later on.

It is useful to be able to adjust the computer in flight if a fix is obtained, by resetting range to its correct value (and similarly $\theta$) all errors accumulated up to that moment are eliminated. To provide this facility, it must be possible to disengage the range servo motor 109 from the drum gear 104 and to run it independently of the contact assembly and the ball-disc multiplier 31.

Range reset subsystem

This is accomplished as follows: The "slew" switch 312 is closed disconnecting range by clutches. Two of its contacts 312B and 312C disconnect the range servo motor 109 from the contact assembly circuits and then apply full voltage to the motor 109 in the appropriate direction. The "slew" contact of the range reset switch 312 opens the ground miles motor circuit and energizes the solenoid 322 of the range reset clutch 204, thus disconnecting the range servo motor 109 from the drum gear 104 of the lead screw differential. While the reset switch 312 is closed (which is a matter of a few seconds at most) the ground miles motor is inoperative and the incoming ground miles data are retained in the "memory" of the ground miles circuit. Once the reset switch is released and the ground miles motor circuit is closed, the stored ground miles are quickly driven in the computer without any computing error. The sequence of operations carried out by switch 312 can alternatively be carried out in the order-declutch and insert memory, and then apply correction. In this latter case contacts 312 and 312B will have only one closed post and contact 312C can be operated from a separate manual switch.

The bearing system

The bearing side of the computer is provided with a similar servo system consisting of the lead screw differential 205, the contact assembly 206 and the D.C. follow-up motor 207. In this case, to avoid placing load on the ball-disc multiplier 35 and to permit the divide by R function to be carried out to zero range, the motor 207 is placed beyond it in the circuit and drives the differential 205 back to its central position through the ball-disc multiplier 35. As in the range side, the solenoid operated clutch 208 is provided which in this case is situated between the ball-disc multiplier 35 and the motor 207.

The bearing servo is the same as the range servo except for the presence of a gain switch 400 which comes into play when the ball carriage 57 approaches the centre of its run and requires a greater speed of follow-up action. This switch is actuated by the range lead screw nut at low ranges. It shorts out resistance 401 in the bearing servo motor lead to provide a higher speed of follow up (see Figure 12).

In Figure 5, the basic computer of the invention, which consists essentially of the range system and the bearing system, is shown as being operationally connected with the two other systems with which in operation it interacts. These systems are (1) the "ground miles" system, which provides the ground miles input to the computer as a shaft rotation and (2) the "track" system which provides the track input to the computer as a shaft rotation. While neither of these two systems is a part of the actual computer, both of them are so intimately associated with its operation that it is important to understand their operation in order to gain an understanding of the operation of the computer taken as a whole.

The ground miles system

The "ground miles" system has as its main purpose the accepting of ground miles data as an electrical signal and the conversion of the electrical signal into a shaft rotation which can be used as an input to the computer of the invention. Two other important functions, however, are embodied in the ground miles system as can best be seen with reference to Fig. 6 which is a functional schematic of its mechanical arrangement. Firstly, the system incorporates a "memory" feature which enables the incoming ground miles data to be stored while the computer is temporarily engaged in other operations, and secondly this system is provided with gear enabling the introduction of ground miles data to the computer from an alternative source. The ground miles system illustrated in Figures 5 and 6 is especially adapted to receive ground miles information originating in an instrument such as the GSIC which is arranged to transmit an appropriate signal. This signal is received and turned into a shaft rotation by the desynn motor 210. This rotates the shaft 211 at a rate proportional to ground speed. The shaft 211 carries the screw 211a of the lead screw differential 212. This lead screw is suitably considerably longer than the lead screws of the lead screw differentials in the bearing and range systems of the computer proper so that a considerable amount of input data can be stored upon it if desired. The lead screw 211a controls the ground miles servo motor 213 through the usual limit switch 214 and the ground miles motor 213 drives the nut 212a of the lead screw differential back to its zero position through the gears 215 and 216 and shaft 217. The gear 216 is mounted on the two-way solenoid operated clutch 218 which, as illustrated, is engaged so that the ground miles servo motor 213 will follow up the data supplied to the lead screw differential 212 by the desynn motor 210. When the clutch 218 is in its other position, the ground miles servo drives the counter 219 and the alternate base distance cursor as will be explained in the section below dealing with alternate base operation. Whenever it is desired to store input information in the lead screw differential 212, the switch 221 is opened, preventing the ground miles motor from following up. When the switch 221 is again closed all the stored data is quickly recovered as the nut is driven back to its central position.

The track system (which is described in detail below) consists essentially of a conventional alternating current positional servo embodying a synchro receiver 222, a servo amplifier 223 and a two-phase induction motor 224 which rotates the track input shaft 68 to correspond to the data received by the synchro receiver 222.

In order that simultaneous information may be supplied on the pilot's instrument panel as well as the navigator's the remote indicator 225 is provided. Two synchro transmitters 226 and 228 are provided which transmit track and bearing respectively, the two motors 229 and 231 receive the transmitted data and convert them back into shaft rotations which control the movement of the indicator needle 232, and indicator 234 respectively to repeat the information which appears on the presentation in the navigator's instrument panel. At the same time, the ground miles step transmitter 227 transmits to the receiver 230 the range data which controls the counter 233 so as to repeat the showing on the range counter 72.

*The track system*

The track system is illustrated schematically in Figure 7.

The track system normally operates to accept track data as a synchro signal and convert it to a shaft rotation which is fed to the computer of the invention by means of the track input shaft 68 (in Figure 3). It is important, however, that rapid changes of track and temporary track errors which may occur during change-overs from normal to alternative base operations should not be permitted to exist while ground miles are being fed into the computer Otherwise, of course, a dead-reckoning position error will result. Accordingly, means are provided in the track system whereby if the error signal of the track servo motor exceeds an amount which is equivalent to about plus or minus 1° a relay switch opens the switch 222 (see Figure 6) until the track servo has caught up and the track error is less than 1°. In addition, the track system provides for the alternative reception of data from the alternate base bearing transmitter synchro which is set manually. It will be appreciated that while the alternate base bearing data is being set into the computer the track indicated on the navigator's presentation will be the false track required for purposes of carrying out the alternative base operation (as may be seen from the description which follows of the alternate base operation). It is important, however, that the pilot should continue to receive an indication of true heading, and accordingly the track system provides for the direct transmission of true heading data to the pilot's repeater in place of the track data which it receives during normal operation whenever the computer is engaged in alternative base operation. True heading data is available as a synchro signal at the same source from which the track data is normally supplied.

As will be observed from Figure 7, the track servo motor 224 is normally energized by an error signal produced in the track control transformer 275 which is amplified in the servo amplifier 276 and whose magnitude is, of course, dependent upon the amount by which the track servo motor 224 lags behind the signal which is received from the source of track information.

The track servo motor 224 is a two phase induction motor having one phase connected to a fixed 26 v. supply and the other connected to a supply which varies in proportion to the track control transformer error signal. In parallel with the variable phase of the track servo motor 224 is the rectifier bridge 234' across which is connected the solenoid 235 of the track error delay relay switch 236. The switch 236 when opened by the relay 235 opens the circuit feeding power to the ground miles motor 213 and thus introduces the "memory" feature in the ground miles system until such time as the switch 236 is again closed. The bridge circuit 234' is designed so that an error voltage in the stator winding 237 in either sense which is larger than the equivalent of 1° error between the rotor and stator of the track control transformer 275 will throw the relay 235 and open the switch 236 holding it open until the error voltage in the stator windings 237 falls below the equivalent of 1° error.

The alternate base bearing transmitter synchro 231 is set manually by means of a dial knob on the navigator's instrument panel, and when the switches 238 and 239 are both thrown into their lower positions, the track control transformer 275 is controlled by the alternate base bearing transmitter synchro 231 rather than from the normal source of incoming track information, with the result that the track servo motor 224 will operate at full speed until the track set on shaft 68 corresponds to that set on the dial knob which controls the alternate base bearing transmitter synchro 231.

During normal operation, the track transmitter synchro 240 which is controlled by the position of the shaft 68 transmits track information to the track receiver synchro 241 which is situated in the remote indicator in the pilot's instrument panel. When, however, the switches 242 and 243 are both thrown to their upper position, true heading data from an alternative source is directly transmitted to the track receiver synchro 241, which drives the pilot's track indicator needle 244. The position of the switches 239 and 238 is controlled by the solenoid relay 245 and the position of the switches 242 and 243 is controlled by the solenoid relay 248 which is connected in parallel with the solenoid relay 245 so that both relays will operate simultaneously during the alternate base operation. Thus the pilot's track indicator 244 will indicate true heading rather than track during the period in which the operation of the track servo motor 224 is controlled by the alternate base bearing transmitter synchro 231.

*Alternate base operation*

The simplified schematic illustrated in Figure 8 shows only those circuit components which form a part of the alternate base sub-system and which come into play during alternate base operation.

The theory of alternate base operation will be explained with reference to Figure 9 which shows the geometry of the problem involved. In Figure 9, A represents the aircraft, O the base from which it is operating, and B the desired alternate base.

Then vector $AO$ = range and bearing of O from A
 = present indication of computer.
vector $AB$ = range and bearing of B from A
 = desired indication of computer.

Vector AB can be derived from AO by adding the vector OB, i.e.

$$AB = AO + OB$$

This vector OB is, of course, the bearing and distance of B from O, and can be determined from a map or from a prepared table. The addition is done as follows:

(a) The track servo is adjusted to correspond to the bearing of O from B.

(b) The ground miles motor drives at high speed until it has fed in the distance from O to B.

That is, the computer acts as if the aircraft had turned and flown from A to $A^1$ at very rapid rate (60,000 knots). During this "flight" the displayed range bearings change from values defining the vector AO to those defining $A^1O$ which equals AB.

After this operation has been completed, the track servo returns automatically to its usual role of repeating aircraft track, and normal computer operations proceed. In carrying out this operation, the alternate base sub-system must provide the following features.

(a) A means of presetting the distance and bearing of the alternate base from the original base, i.e., the length and bearing of vector OB.

(b) A method of changing the track setting of the computer from the actual aircraft track to a fictitious track equal to the reciprocal of the bearing of OB (Figure 3, 8A).

(c) Operational delays to stop the ground miles motor while the track pointer and sine cranks change position, at both the beginning and end of the process.

(d) An automatic cutoff to stop the process when the required distance has been fed in.

(e) A means of storing and subsequently feeding in the ground miles actually flown during the computation.

Referring to Figure 8, when the alternate base operation is to be carried out, the length of the alternate base vector is preset by Vector Dist knob 300 which is situated on the front face of the computer. This knob is connected to the vector distance cursor ring 301 which is transparent over the portion 302 so as to reveal a sector of the fixed vector distance dial 303 which is behind the cursor ring 301. The instant the cursor is moved from its zero point a cam (not shown) on the cursor ring 301 allows the switch 304 to close and as the cursor line 305 passes about the 30 mile position, another cam (not shown) on the cursor ring 301 permits the switch 306 to close. Closure of the switch 304 switches on a lamp 304a which illuminates the vector distance dial 303 (which suitably consists of a plexiglass ring) and grounds one terminal of the alternate base relay 307. Closure of switch 306 shorts the resistance 308 out of the circuit which during the alternate base operation supplies power to ground miles servo motor 213.

The direction of the alternate base vector is preset Vector BRG knob 309 which is also located on the front face of the computer and which directly drives (i) An indicating pointer 310 which rides around the R$\theta$ compass dial 311, (ii) The alternate base bearing synchro 231 as well as, (iii) A small ½° detent (not shown) which insures accurate and repeatable settings.

The setting in of the alternate base vector by means of the Vector Dist knob and the Vector BRG knob does not interfere with the normal operation of the computer, and may be done at any time before actually performing the alternate base operation. The only difference in the presentation from that obtained during normal operation is that with the alternate base distance cursor not at zero the alternate base distance dial remains illuminated by the lamp 304a.

The alternate base operation is initiated by pressing down on the alternate base lever 412. This action zeros the alternate base distance counter 413 and by means of the cam 414 actuates switches 315 and 316 from the upper position shown to the lower position.

The AB distance counter 413 is designed so that each of its three wheels, when indicating zero, opens at least one associated contact of the counter zero switch 317. In all other positions, the contacts are closed. The hundreds wheel opens contacts A and D when displaying zero; the tens wheel opens contacts B and E when displaying zero and the units wheel opens contact C when displaying zero. Thus, when the counter 413 is zeroed, all the contacts of the switch 317 are open. The simultaneous actuation of switches 315 and 316 removes power from the ground miles servo motor 213 which therefore stops, diverting incoming ground miles on to the memory in the ground miles system. At the same time, power is applied to alternate base relay 307 and the alternate base erase relay 318. However, with the counter 413 zeroed, contacts A, B and C of switch 317 are opened, and the alternate base erase relay 318 has no ground connection. The alternate base relay 307, however, has a ground connection through switch 304 which was closed as the vector distance cursor ring 301 was moved from its zero position. The alternate base relay is, therefore energized, and in so doing, is locked in the closed position by the contact set 319 which connects the upper end of it with the X1 bus which carries +28 volts direct from supply, and contact set 320 which in the lower position grounds the X2 bus through switch 304 which is now closed. The buses X1 and X2 are both normally connected to the 28 volt direct current supply via the normally closed upper contacts of switches 315 and 316. When the X2 bus is grounded, all of the devices connected between the buses X1 and X2 will have voltage applied across them. As soon as the alternate base lever 412 is released (to return to its neutral position by spring pressure) the switches 315 and 316 are returned to their original position and 28 volts are applied to the X1 bus via the upper contacts of the alternate base erase relay 318. The X2 bus is already grounded as mentioned above. The devices affected are the track transfer relay 245, the ground miles clutch solenoid 322 and the remote track change relay 248.

The track transfer relay 245 replaces the track signal which is the normal input of the computer with the alternate base bearing signal which has been manually set into a synchro 231. The ground miles clutch solenoid shifts the ground miles clutch 218 and closes the ground miles transfer switch 324. The remote track change relay 248 replaces the track signal feeding the synchro receiver 241 (in the remote indicator) by true heading which is received directly from its usual source (normally the ground speed and interception computer). In this manner, the pilot is provided with a suitable heading indication enabling him to hold his course steady during the alternate base operation. The track servo motor 224 now proceeds to follow up the alternate bearing signal, the large follow up error present energizing the track error delay relay 235 and holding open the circuit to ground miles motor 213, preventing the latter from operating.

The ground miles transfer switch 324 which was closed by the ground miles clutch solenoid 322 energizes the ground miles transfer relay 325, transferring control of the ground miles servo motor 213 from its normal channel to bus X1 which is now at 28 volts D.C. and via switch 306 and resistance 326 to bus X2 which is now grounded through the upper contacts 320 of alternate base relay 307 and switch 304. It is to be noted at this point that as in normal operation the upper terminal of the ground miles servo motor 213 is still connected ultimately to the +28 volt terminal so that the ground miles motor will operate in its normal direction.

As soon as the track error has been eliminated by reason of the track servo motor 224 driving the computer to the position indicated by the alternate base bearing synchro 231, and as soon as the lever is up, the error voltage energizing the track error delay relay 230 disappears allowing its switch to fall out, energizing the ground miles servo motor 213 which begins to drive slowly, carrying with it besides the ball-disc multipliers in the computer, the AB distance cursor ring 301, and the AB distance counter 413. After one mile has been driven into the computer in this fashion, contact C of switch 317 is closed. This has no effect since switch 316 is in its upper position. After ten miles have been driven in to the computer, contacts B and E of switch 317 are closed, and the latter shorts out the resistance 326 so that the full line voltage is now applied to the ground miles servo motor 213 permitting it to drive at full speed.

The ground miles servo motor 213 continues to drive at full speed (which corresponds to approximately 60,000 knots) until, with about thirty miles to go, the cam on the AB distance cursor ring opens switch 306, thus placing the resistance 308 in series with the ground miles servo motor 213 cutting it down to reduced speed. As the cursor zero line reaches zero on the alternate base distance dial 303, the switch 304 is opened removing the ground connection from both the alternate base relay 307 and the dial lamp 304a. As the alternate base relay 307 falls out, bus X2 is connected to the 28 volt line so that the ground miles clutch solenoid 322, the track transfer relay 245, and the remote track change relay 248 are all released and the ground miles servo motor 213 stops.

Control of the track servo motor 224 is now restored to the track control transformer synchro 240 and the track servo motor 224 now proceeds to drive the computer to the proper position corresponding to aircraft track. While this is being done, the track error delay relay 235 is energized, preventing the ground miles servo motor 213 from operating.

As switch 324 opens as a result of the release of the ground miles clutch solenoid 322, the ground miles transfer relay 325 releases returning control of the ground miles motor to the ground miles contactor switch 214.

As the cursor ring 301 was being driven from its initial setting down to zero, the alternate base distance counter 413 was being driven up from zero so that at the end of the operation this counter displays the value originally set up manually on the cursor ring. With this distance on the counter, it is obvious that at least one of the contacts A, B and C of the switch 317 will be closed so that the relay 318 will be left with a ground connection.

As the track servo motor 224 finishes driving the computer to correspond to aircraft track, the error voltage holding in the track error delay relay 236 disappears releasing the relay and closing the circuit of the ground miles servo motor 213. Ground miles contactor switch 214 is already closed because of the ground miles stored in the memory lead screw assembly, and the ground miles motor 213 immediately drives all the stored ground miles into the computer on present aircraft track, after which normal operation of the entire computer is resumed.

A further feature of the alternate base operation is that the whole operation may be run in reverse to replace the alternate base with the original base simply by raising the alternate base lever 412. How this is carried out by the various components of the circuit illustrated will now be described.

The mechanical connection of the alternate base lever is such that when this lever is lifted it does not zero the alternate base distance counter 413. However, raising of the alternate base lever 413 will, just as in the case of alternate base operation, close switches 315 and 316. Operation of these switches disconnects the 28 volt line from the ground miles servo motor circuit and applies it to relays 318 and 307. The alternate base erase relay 318 it will be remembered was on completion of the alternate base operation left with a ground via the counter zero switch 317 and it accordingly operates and locks itself in. The alternate base relay 307 is not energized because the switch 304 is left open when the alternate base distance cursor ring 301 is left at zero following the alternate base operation. The polarity of buses X1 and X2 is, therefore, the reverse of their polarity during the alternate base operation, i.e. in this instance bus X1 is grounded while X2 carries 28 volts D.C. once the alternate base lever is released.

The ground miles clutch solenoid 322 and relays 323 and 321 being insensitive to polarity are all energized just as in the alternate base operation and the same sequence of operations now occurs involving the ground miles clutch 218, the ground miles transfer switch 324, the ground miles transfer relay 325, and the whole track system, as is described above in connection with the alternate base operation. The only difference is that reversal of the polarity of the X1 and X2 buses reverses the direction of rotation of the ground miles motor 213 so that in this case once the motor starts, it drives the alternate base distance cursor ring 301 up from zero switching on the dial lamps 304a via switch 304 as it does so and simultaneously driving the alternate base distance counter 413 down towards zero. The motor speed will be low until, when thirty miles have been driven in, switch 306 is closed by the cam on the alternate base distance cursor ring, shunting the resistance 308 out of the motor line and causing the motor to be driven at its full speed which corresponds to 60,000 knots.

When the alternate base counter 413 has been driven down to 099 miles, contacts A and D of switch 317 are opened. At 009 miles contacts B and E are also opened, the latter inserting resistance 326 into the ground miles motor line to reduce the speed of the ground miles motor 213 to about ⅕ of its initial value. This reduction in speed eliminates the possibility of overshoot when 000 miles is reached, at which point the alternate base erase relay 318 falls out since it no longer will have a ground connection when contact C of switch 317 is opened.

At this point, the return of the track system to present track and the return of control of the ground miles servo motor 213 to the ground miles contactor 214 takes place in exactly the same manner as in the case of the alternate base operation, the instrument being left in exactly the same condition as it was immediately before the alternate base operation, i.e. dial lamps 304a are on and the mileage originally set into the alternate base distance dial will once again be indicated on it. Similarly, the alternate base bearing indicator 310 remains set at the bearing which was originally set into it before the initiation of the alternate base operation. The complete sequence of adding and then subtracting the alternate base vector can be repeated as often as desired merely by successively pressing and then lifting the alternate base lever 312.

One principal advantage of the alternate base system outlined above is that it enables simple coordination of the computer with a grid system of maps having a number of symmetrically spaced grid centres. In general, several bases will be included in a given grid area sharing a common grid map. The map carries polar coordinates with origin at grid centre so that by basing himself at this point a navigator may take advantage of any fix however obtained to correct his computed position. When he wishes to return to his own or any other airfield, however, he simply changes his base using the alternate base procedure to home on the base to which he wishes to proceed. The vector from the airfield to the grid centre may be set up prior to take-off and subsequently added or erased whenever position fixing or homing is to be carried out. An additional advantage inherent in the erase feature of the system is that, should a vertor be incorrectly set up and added, it may be erased simply by lifting the alternate base lever 312, without any error having been introduced into the dead-reckoning of the computer.

*Automatic reciprocal operation*

One of the principal difficulties encountered in the successful use of a navigational system which is arranged to produce navigational data in terms of polar coordinates is that when flying directly over base or close to it, an extremely high relative rate of change of bearing to base takes place which is in general, at ranges of appreciably less than two miles, many times the rate of change which is encountered in normal operation and which approaches infinity as range approaches zero. The difficulty of coping mechanically with this situation is obvious while the difficulty of coping with it electrically is apparent when one takes into consideration the fact that, whatever electrical system of computing is used, the indication of bearing to base must always involve the use of some mechanical components in the system.

From the practical point of view, it is, of course, obvious that accurate positional information is not required from a dead-reckoning type of computer when the aircraft is within visual or low powered radio range of the base, and accordingly, it will be appreciated that the only essential requirement is that on approaching base the computing mechanism must be relieved from the strain of following a change of direction to base which exceeds the capability of the computing circuit, and that the computer be in appropriate condition on leaving the base area once again to represent accurately the polar coordinate position of the aircraft as it continues on its course. A suitable method of taking care of this problem is illustrated in Figure 10 which is a simplified functional schematic of the automatic reciprocal sub-system preferred for use in the embodiment of the invention which has just been described.

Basically, the sub-system takes over control of the computer whenever range becomes less than two miles, i.e. automatic reciprocal operation will take place whenever the aircraft enters a circle of two miles radius with its centre at the base. As the aircraft enters the two mile circle, normal operation is suspended and the automatic reciprocal sub-system takes over control of the computer. The net result of the operation is that a small computational error is introduced into the computation which varies from zero to approximately two and one-half miles; depending upon how nearly the aircraft passes directly over the base. This error rises as the result of an apparent shift of base from its original position to a position which is two miles ahead of the point at which the aircraft enters the two mile circle.

Referring now particularly to Figure 10, when the range is reduced to two miles, the two mile switch 350 which is a micro switch actuated by the R cam 361 on the range lead screw 51 is operated. The operation of switch 350 removes one 28 volt D.C. line from switch 351b of relay 351 (range lower limit) which however remains closed, and applies this line to both relays 352 (bearing transfer) and 500 (reciprocal). Relay 352 diverts control of the bearing servo motor 207 away from its normal channel and onto another channel consisting of relays 354 (reciprocal reversing) and 353 (reciprocal sensing). Simultaneously relay 500 opens the ground miles motor circuit at switch 500b preventing further action of that motor, and via switch 500a energizes the bearing clutch solenoid 322 which, by opening the bearing clutch 208, mechanically disconnects the bearing servo motor 207 from the bearing lead screw differential. Incoming ground miles are temporarily stored in memory, and the bearing servo motor drives rapidly under its new control towards the position corresponding to $\theta-T$ equals zero, i.e., flight directly towards base. This latter action is described more fully in the following paragraph.

Reciprocal reversing relay 354 and reciprocal sensing relay 353 are both, in effect, reversing switches connected in tandem between the 28 volt supply and the bearing servo motor. Reversal of either one of these relays reverses the excitation and therefore the direction of rotation of the bearing servo motor 207. The circuit connections are such that when the reciprocal reversing relay 354 is not energized the bearing servo motor 207 drives the $\theta$ pointer, the $\theta-T$ shaft, and the sine cranks in such sense as to make $\theta-T$ equal to zero. As the $\theta-T$ shaft turns, its cams 355, 356, and 357 operate their associated switches at the values indicated on the drawing. At $\theta-T=0$, cam 355 closes the reciprocal sensing switch 358.

This applies a ground connection to the reciprocal sensing relay 353 moving the contacts 353a and 353b to the lower position reversing the sense of the excitation of bearing servo motor 207 and therefore its direction of rotation, and in turn reversing the direction of movement of the reciprocal sensing cam 355 and so on, setting up a continual hunting action of the bearing system centred about $\theta-T=0$ and corresponding to flight directly towards base. While this hunting action continues, the ground miles relay cam 357 by reason of its notch at 0° permits the two mile over-ride switch 359 to close, re-energizing the ground miles system. It may be noted in passing that the notches in the ground miles relay cam 357 are sufficiently wide that the two mile over-ride switch 359 will not be opened by the slight back and forth movement of the sine crank shaft which occurs during the hunting action of the bearing system about 0° (or about 180° when the other notch comes into play).

The ground miles servo motor 213 now drives the ground miles which have been stored temporarily on memory into the computer, and computed range will decrease as though the aircraft were headed directly towards base.

The range servo has a ground connection via the range lower limit switch 360, which is a micro switch also actuated by the R cam 361 on the range lead screw 51. In general the distance stored in the ground miles memory will be less than two miles, and after this stored distance is driven into the computer, a short period of normal operation will take place until the computed range reaches zero miles. At this point R cam 361 moves the range lower limit switch 360 from the position shown, where it provides ground to the range servo and to lower limit relay 351, to the upper position where it picks up the 28 volt line. With 28 volts applied to both ends of the range servo motor 109 it is in effect short circuited and brakes immediately to a stop. The application of 28 volts to the previously grounded terminal of range lower limit relay 351 causes that relay to open, and so to apply a ground connection to reciprocal reversing relay 354 via switch 351a.

It will be observed that all of the ground miles that have been passed into the computer since the two mile circle has been entered are run in on the constant bearing $\theta-T=0$, so that the fact that the bearing servo motor 207 is declutched from its lead screw differential is irrelevant as regards introduction of positioning error.

The closing of reciprocal reversing relay 354 reverses the sense of the bearing servo control and therefore makes the existing hunting unstable. Thus the bearing servo motor drives to the stable hunting position at $\theta-T=180°$, corresponding to flight directly away from base.

While the bearing servo motor 207 is driving the bearing system through 180°, the ground miles relay cam 357 holds open the two mile over-ride switch 359 diverting incoming ground miles on the memory. When $\theta-T$ reaches 180°, the over-ride switch 359 closes, and the ground miles which has been stored enter the computer.

As the present situation corresponds to flight away from base, the range lead screw differential, driven by the ground miles input, causes the range contact assembly 307 to move to the "range increasing" attitude. As soon as contact 107b supplies a ground to the range servo, this servo follows, a ground being provided via the range upper limit switch 315 (see Figure 13). Immediately as range leaves its zero position the range lower limit switch 360 is closed, and applies a ground line to range lower limit relay 351. However this relay remains disengaged, as, with the two mile switch 350 still operating the relay, it has no 28 volt connection to its coil.

As further ground miles are driven into the computer, computed range increases while $\theta$ continues to hunt about the reciprocal of track. As a range of two miles is reached, the R cam 361 releases the two mile switch 350 de-energizing the bearing transfer relay 352 and the reciprocal relay 500. The latter releases the bearing clutch solenoid 322 via switch 500a and restores the normal connection to the ground miles motor via switch 500b.

The two mile switch 350, in releasing, applies the 28 volt line to range lower limit relay 351 in such a manner that this relay is energized and latches in, a resistor across its coil being provided to ensure this action.

Thus normal operation of the bearing system and of the entire computer is resumed. As mentioned briefly above, the object of this entire operation is to elminate the need for the bearing system to function at very high (theoretically infinite) speeds in the vicinity of its base without introducing large errors in the computation. It will be appreciated that provision for such very high speeds in the bearing system would greatly add to the complexity and bulk of the computer. A consequence of the operation is that the aircraft's base is apparently shifted from its proper position to one which lies two miles ahead of that point at which the two mile circle was entered. The error involved lies between 0 when the aircraft actually flies directly over base and approximately two and one-half miles when the aircraft touches the two mile circle tangentially. If the aircraft changes course after having entered the two mile circle, the apparent position of base will shift in accordance with the track being flown during the time in the reciprocal operation when the two mile over-ride switch 359 is closed and ground miles are being driven into the computer. Thus, if the aircraft changes course after entering the two mile circle, the apparent shift of base will be increased or decreased slightly depending respectively upon whether the aircraft changes course towards the real base or away from it.

It will be appreciated that the net result of the automatic reciprocal operation is really the same as the net result of an alternate base operation where the alternate base vector is very short and in fact the problem involved in flying over or very close to base can be solved equally well from a computational point of view without the introduction of any error by the carrying out first of all of an alternate base operation as the aircraft approaches base followed by an alternate base erase operation when the aircraft has passed a reasonable distance beyond the base. However, if the problem is to be overcome in the manner just mentioned, a further difficulty must be overcome to provide for the situation where the alternate base vector happens to lie in a direction which passes directly over the real base or directly away from it. As was mentioned in connection with the alternate base operation, a situation of this sort will leave the track servo motor without directional sense when the alternate base bearing synchro takes over or relinquishes control of the track servo motor, introducing the possibility of the introduction of 180° of error in the direction of the alternate base vector run into the computer. To overcome this difficulty would involve the use of a pair of relays such as relays 353 and 354 which would involve as bulky a system as required for the fully automatic reciprocal sub-system just described, while at the same time introducing the additional mildly undesirable feature that during the operation the navigator would observe false track information on the face of his instrument, and the pilot as in the alternate base operation, would receive true heading instead of track.

The problem could, of course, be overcome by the introduction and erasal of an arbitrary alternate base vector mechanically preset in suitable means associated with the system and arranged so that its direction on introduction would be at between 90 and 180° of track. In this case, the track servo motor will never be concerned with the situation where it has no sense indication but such system would involve additional mechanical components in the computer system as well as protective devices preventing interference with the alternate base controls (the two knobs and lever) while the aircraft is within approximately two miles of base. As it is frequently desirable, as previously mentioned, to preset an alternate base vector to a grid centre on the alternate base controls before take-off, the system previously described is considered more desirable, and it is believed to afford greater operational versatility.

As previously discussed, the computer of the invention will continuously indicate the positions of a moving point (the aircraft) relative to a fixed point (a ground base) provided the correct vector velocity of the aircraft relative to the ground is continuously fed into it. In normal operation, the required vector is ground speed and track, and this is normally produced as already mentioned in the G.S.I.C. or other instrument adapted to produce the same outputs which accepts true air speed, true heading and wind speed and wind direction data and produces ground speed and track as output in desired analogue form as rates of rotation.

The computer of the invention will, however, compute the relative position of two moving points, i.e. two aircraft in exactly the same manner provided the appropriate vector related to the speeds of the two aircraft is substituted for the ground speed and track which are fed into it during normal operation. The required vector is the sum of two other vectors, namely the velocity of the target aircraft and the velocity of the interceptor aircraft, relative to the air mass.

The G.S.I.C. triangle is admirably suited to solve the interception triangle problem inasmuch as its mechanism is set up to deal with a wind vector problem where the convention applicable to the representation of the vectors is 180° different from that obtaining in normal vector diagrams. Consequently, although it is the reverse of the target aircraft's velocity through the air that must be introduced into the G.S.I.C. if the inter-vector relationships are to be correct, the representation of the target aircraft's velocity in the form of a wind vector analogue automatically sets up the vector of target aircraft's velocity as its reciprocal.

Thus, if the target aircraft heading and air speed are set into the G.S.I.C. on the wind direction and wind speed dials respectively, the output of the G.S.I.C. becomes a fictitious track and ground speed related to the speed of the target aircraft. If the position of the target aircraft at a particular time is established as base on the computer of the invention by a series of alternate base operations as will be described later, the $R\theta$ will then give a continuous indication of the direction to the target aircraft and the range.

This is accomplished as follows (see Figure 14): When an interception operation is to be carried out, the G.C.I. station which will be in radio contact with the aircraft so informs the aircraft and the $R\theta$ computer is adjusted by an appropriate alternate base operation to be based on the G.C.I. station. At the same time, the G.C.I. station will calculate the alternate base vector joining the G.C.I. station with a predicted position of the target aircraft a short time (for instance two minutes) in the future. This information is relayed to the aircraft and the appropriate data is set up on the alternate base bearing and alternate base distance knobs on the front panel of the instrument. At the same time, the target aircraft's heading and air speed are radioed to the aircraft, and then this heading and air speed are introduced into the G.S.I.C. by means of the wind direction and wind speed dials. At the same time, the alternate base operation is carried out establishing the target aircraft's position as base and from then on the $R\theta$ bearing pointer will indicate continuously the present bearing of the enemy while the range counter will indicate the distance which separates the target aircraft from the interceptor aircraft. Changes of enemy airspeed or heading are reported from time to time by the G.C.I. station and are introduced as required into the G.S.I.C. Accumulated errors are taken out by vector corrections passed by G.C.I. In order to intercept the target, all that is required is that the interceptor aircraft maintain the track and heading pointers on the $R\theta$ dial in alignment. The interceptor, however, does not need to fly a course of constant bearing. It may alter course as required, for instance to avoid a heavily defended area or to manoeuvre into a more favourable line of approach to the target. It may however at any time adopt a homing course of constant bearing by lining up the track and bearing pointers. Interception occurs when the range on the $R\theta$ dial has been reduced to zero (the automatic reciprocal operation will, of course, come into play when range decreases below two miles, but as the aircraft will be flying directly towards the target, visual or airborne radar contact should be established by the time the two mile circle is entered or very shortly thereafter).

On completion of the interception mission, the range and bearing from the aircraft to the G.C.I. station can be communicated to the aircraft and with the latest available wind speed and wind direction data once again set into the G.S.I.C. the correct range and bearing to the G.C.I. station can be set into the Rθ by means of the reset levers and once again the Rθ will continuously indicate the range and bearing to the G.C.I. station. When released from its interception role by the G.C.I. station, the aircraft may be homed on its base simply by the carrying out of an appropriate alternate base operation and aligning the track and bearing pointers until the aircraft arrives at its base.

It will be observed from the above that an aircraft equipped with the computer of the present invention in association with the G.S.I.C. can be directed back to its home base by the G.C.I. station with the minimum of transmission of data by radio since the bearing and distance of the aircraft to the G.C.I. station is all the information required to enable the aircraft to home by dead-reckoning on its original base.

The present invention when used in conjunction with the G.S.I.C. or other instrument producing a suitable output (see Figure 15) provides an accurate means for dead-reckoning navigation directly in polar coordinates. Basically, the method of dead-reckoning navigation provided depends upon the following:

(1) Means within the aircraft for continuously producing the analogues of the speed and direction of the aircraft's travel relative to the ground (suitable means including an instrument such as the G.S.I.C.).

(2) Means for computing from said analogues the polar coordinates of the aircraft with respect to a given point on the ground (such as the Rθ computer described herein).

(3) Means for displaying an indication of said polar coordinates and the direction of flight of the aircraft.

(4) Means for adjusting the indication displayed by said computing means.

(5) Means for interrupting the operation of the computing means during the adjustment of the displayed indication, temporarily storing incoming information relating to the analogue of the speed of the aircraft's travel relative to the ground during such interruptions and feeding the thus stored information into the computing means following said interruptions.

As indicated in the foregoing description, the adjustments which may be required to be made to the displayed indication may be of various types, for instance, if during flight a fix is obtained, it may be desired to adjust either the range or bearing indicators to eliminate any dead-reckoning error which may be present in the instrument. It may, on the other hand, be desired to have the computer effect dead-reckoning in polar coordinates in respect of a different base from that with respect to which it is computing at any particular time. In addition, automatic adjustments may be desired such as that which takes place during the automatic reciprocal operation in order to relieve the computer from the strain which would result from computations very close to the base and the resulting very high rate of change of bearing. All of the above adjustments require a short interval of time for their accomplishment, but it is important at the high rate of speed attained by modern aircraft that the adjustments be carried out without losing the input data which represents the distance flown during the interval. No provision need be made for storing data relating to the direction of the aircraft's travel since as long as the aircraft maintains a substantially constant bearing during the interval required for the carrying out of the adjustment no appreciable error will be introduced when the speed analogue information is fed back from storage into the computer.

What I claim as my invention is:

1. Apparatus for solving navigational problems in polar coordinates comprising; a first ball-disc multiplier and a second ball-disc multiplier; means for driving the discs of said first and second ball-disc multipliers in accordance with an input rotation which corresponds to a cumulative distance travelled from a datum point; a first sine crank and a second sine crank associated respectively with said first and second ball-disc multipliers whereby the positions of said sine cranks determine the displacements of the ball carriages of their associated ball-disc multipliers; a range lead screw; means for rotating said lead screw to correspond to the rotation of the drum of said first ball-disc multiplier; a nut on said lead screw arranged to be axially displaced by rotation of said lead screw; a third ball-disc multiplier; means for rotating the drum of said third ball-disc multiplier in accordance with the rotation of the drum of said second ball-disc multiplier; means connecting said nut and the ball carriage of said third ball-disc multiplier whereby the latter is displaced an amount corresponding to the displacement of said nut on said lead screw and the rotation of the disc of said third ball-disc multiplier corresponds to the rotation of the drum of said second ball-disc multiplier divided by the rotation of the drum of said first ball-disc multiplier; a mechanical differential; means for rotating one input gear of said differential to correspond with the rotation of the disc of said third ball-disc multiplier; means for rotating a second input gear of said differential to correspond to a direction being travelled, whereby the output appearing at the third gear of said differential is the rotation of said first input gear minus the rotation of said second input gear; means for positioning said first and second sine cranks in accordance with the output of said differential whereby the displacements of the ball carriages of the first and second ball-disc multipliers correspond respectively to the sine and cosine of the angle through which the output gear of the differential has been rotated from a given datum; servo means for driving said apparatus in accordance with the inputs delivered thereto; indicating means for indicating the respective angular positions of the disc of said first ball-disc multiplier, and the first and second input gears of said differential respectively as distance from base, direction to base, and direction being travelled; a D.C. follow-up "ground-miles" servo motor operatively connected to drive the discs of said first and second ball-disc multipliers; a "ground-miles" lead screw; solenoid actuated clutch means; said motor being operatively associated with said lead screw through said clutch means; a toothed nut member in threaded engagement with said lead screw; an elongated gear member meshed with said nut whereby rotation of said gear member rotates said nut advancing the latter along said lead-screw; means for rotating said elongated gear member responsively to said first input; switch means controlling the power leads to said motor; actuating means for said switch means associated with said nut member whereby said switch means is opened when said nut is in a zero position on said lead-screw, and closes when said nut is displaced from said zero position; the direction of rotation of said motor, when energized, being such as to displace said nut member towards said zero position on said lead-screw; and at least one "memory" switch in the power leads of said motor whereby said motor is rendered inoperative while said "memory" switch is open; said lead screw and said elongated gear member having sufficient length to accommodate a predetermined amount of displacement of said nut from its zero position, corresponding to a predetermined quantity of accumulated input data.

2. Apparatus as defined in claim 1 wherein said servo means comprises; an input shaft carrying the output from one of said ball-disc multipliers; an output shaft; a lead screw operatively associated with said output shaft; a nut member in threaded engagement on said lead screw; an elongated gear member in mesh with said nut and operatively associated with said input shaft; a servo motor arranged to drive said output shaft in either direction; and control means for said servo motor arranged to cause said motor to rotate said lead screw in a direction which will displace said nut towards a predetermined zero position on said lead screw whenever said nut is displaced from said position by rotation of said nut by said input shaft.

3. Apparatus as defined in claim 1 wherein said servo means comprises; an input shaft carrying the output from one of said ball-disc multipliers; an output shaft; a lead screw operatively associated with said output shaft; a nut member in threaded engagement on said lead screw; an elongated gear member in mesh with said nut and operatively associated with said input shaft; a servo motor arranged to drive said output shaft in either direction; control means for said servo motor arranged to cause said motor to rotate said lead screw in a direction which will displace said nut towards a predetermined zero position on said lead screw whenever said nut is displaced from said position by rotation of said nut by said input shaft; and means for declutching said output shaft from said lead screw.

4. Apparatus as defined in claim 1 wherein said servo means comprises; an input shaft carrying the output from one of said ball-disc multipliers; an output shaft; a lead screw operatively associated with said output shaft; a nut member in threaded engagement on said lead screw; an elongated gear member in mesh with said nut and operatively associated with said input shaft; a servo motor arranged to drive said output shaft in either direction; and limit switch means operatively associated with said nut for controlling the operation of said servo motor, said limit switch being arranged to cause said servo motor to rotate said lead screw and said output shaft in a direction which will displace said nut towards a predetermined zero position on said lead screw.

5. Apparatus as defined in claim 4 in which said servo motor is a direct current follow-up type motor and said limit switch comprises a first contact connected to one pole of a source of direct current supply for said motor; a pair of second contacts resiliently mounted one on either side of said contacter member and biased into contact therewith, said second contacts each being connected electrically to an opposite pole of said motor; a pair of third contacts, each resiliently suspended in spaced apart relation to one of said second contacts on the sides of said second contacts remote from said first contact, said third contacts being electrically connected to the other pole of said D.C. current supply; and a contact actuator member operatively associated with said nut and said second contact members whereby movement of said nut from the zero position in either direction carries one or other of said second contacts against one of said third contacts, energizing said motor with a polarity which will cause it to drive said nut back towards its zero position.

6. Apparatus as defined in claim 5 in which said limit switch means comprises a fourth pair of contacts exterior to said third set of contacts and spaced apart therefrom; a normally closed "memory" switch arranged in power leads of the "ground miles" servo motor; and relay means for opening said "memory" switch whenever one of said third contacts is driven against one of said fourth contacts, whereby incoming first input data is stored in the "ground miles" lead screw until said third contact is released from said fourth contact.

7. Apparatus as defined in claim 6 and further comprising a second normally closed "memory" switch in the power lines of the "ground miles" servo motor; a relay for actuating said second "memory" switch; and means for energizing said relay to open said switch responsively to an error signal of predetermined value derived by comparing the second input value with the actual position of the shaft which carries said input into the apparatus.

8. Apparatus as defined in claim 5 and further comprising a solenoid operated clutch between the lead screw of said servo means and the servo motor; a normally closed "memory" switch connected in the power supply line of the "ground miles" motor; relay means to actuate said "memory" switch; slew switch means for applying full power to the servo motor of said servo means with predetermined polarity; and manually operable actuating means arranged on movement to an actuating position in sequence to actuate said relay means opening said "memory" switch, energizing the solenoid of said solenoid operated clutch to declutch the servo motor from its associated lead screw, and applying full power to said servo motor to drive the latter in a predetermined direction, and upon return movement from said actuating position in sequence to cut-off power from said servo motor, de-energize said solenoid and de-energize said relay to close said memory switch.

9. Apparatus as defined in claim 8 wherein said servo motor is provided with dynamic braking.

10. Apparatus as defined in claim 1 and further comprising means for altering the datum point with respect to which said computing means computes the polar coordinates of range and bearing, said means comprising; means for manually presetting the vector distance between the original datum point and a new datum point; a control circuit arranged to assume control of the servo means driving said computing means to cause the computing means to simulate a flight path corresponding to a vector distance which is preset; means for opening a "memory" switch in the power leads to the "ground miles" motor to divert incoming "ground miles" analogue data onto "memory;" means for declutching the "ground miles" motor from the "ground miles" lead screw and operatively associating it with the means for presetting the vector distance; and actuating means arranged to actuate said means in sequence to divert incoming "ground miles" analogue data on to "memory," declutch the "ground miles" motor, switch control of the "ground miles" motor and servo motors to the said control circuit, and restore the normal operation of the computing means after said preset vector has been introduced.

11. Apparatus as defined in claim 10 including indicating means for recording the length of the vector introduced to said computing means.

12. Apparatus as defined in claim 11 wherein said actuating means includes a pair of tandem connected relays controlled by switch means so arranged that closure of said switch means a first time causes said control circuit to introduce said preset vector into the computing means, but closure of said switch means a second time causes said control means to introduce into the computing means the reciprocal of said preset vector, thus effectively withdrawing the preset vector first introduced.

13. Apparatus as defined in claim 1 further comprising automatic means for opening a "memory" switch in the power supply of the "ground miles" motor when the indicated polar coordinate of range falls below a predetermined value; and an "automatic reciprocal" control circuit arranged to assume control of said computing means while said coordinate is less than said predetermined value and restore normal control thereto when said coordinate rises above said predetermined value, said control circuit comprising means for driving the computing means to a position where the indicated polar coordinate of direction is the same as the indicated direction of flight, means for reintroducing "ground miles" analogue data until the indicated polar coordinate of range equals substantially zero, means for driving the computing means to a position where the indicated polar coordinate of bearing is the reciprocal of the indicated direction of flight of the aircraft; means for reintroducing "ground miles" analogue data until the indicated value of the polar coordinate of range equals said predetermined value, and means for closing said "memory" switch and releasing said computing means from control by said control circuit.

14. Apparatus for solving navigational problems in polar coordinates comprising; mechanical resolving means; means for continuously setting into said resolving means as a unidirectional continuous shaft rotation a first input thereto being a distance factor analogous to a cumulative distance travelled from a datum point; means for continuously setting into said resolving means as a second input thereto a directional factor representing the angle between a direction being travelled and the direction to said datum point; said resolving means being arranged to deliver a first output and a second output analogous respectively to change of distance to said datum point and change of distance travelled normal to the direction of said datum; a divider; means for setting said second output into said divider as an enumerator; means for setting into said divider said first output as a divisor; the output of said divider being analogous to the change of direction to said datum point; means for supplying a factor analogous to the change of direction being travelled; means for subtracting said factor representing change of said direction being travelled from the output of said divider and delivering the resultant to said resolving means as said directional factor; and means for indicating cumulatively the change of direction and change of distance to said datum point as the polar coordinates of position with respect to said datum point.

References Cited in the file of this patent
UNITED STATES PATENTS 2,532,158    Ewing _____ Nov. 28, 1950

OTHER REFERENCES

Product Engineering ("Mechanical Computing Mechanisms," parts II and III, by Reid and Stromback), 1949, September, pp. 119–123 and October, 126–130.